(12) United States Patent
Yang et al.

(10) Patent No.: US 12,407,854 B2
(45) Date of Patent: Sep. 2, 2025

(54) ARTIFICIAL INTELLIGENCE (AI) ENCODING APPARATUS AND METHOD AND AI DECODING APPARATUS AND METHOD FOR REGION OF OBJECT OF INTEREST IN IMAGE

(71) Applicant: SAMSUNG ELECTRONICS CO., LTD., Suwon-si (KR)

(72) Inventors: Heechul Yang, Suwon-si (KR); Hyunkwon Chung, Suwon-si (KR); Inhak Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 45 days.

(21) Appl. No.: 18/195,221

(22) Filed: May 9, 2023

(65) Prior Publication Data

US 2023/0276070 A1    Aug. 31, 2023

Related U.S. Application Data

(63) Continuation of application No. PCT/KR2021/013363, filed on Sep. 29, 2021.

(30) Foreign Application Priority Data

Nov. 9, 2020 (KR) .................. 10-2020-0148696
Dec. 11, 2020 (KR) .................. 10-2020-0173500

(51) Int. Cl.
*H04N 19/59* (2014.01)
*H04N 19/124* (2014.01)
*H04N 19/169* (2014.01)

(52) U.S. Cl.
CPC ........... *H04N 19/59* (2014.11); *H04N 19/124* (2014.11); *H04N 19/188* (2014.11)

(58) Field of Classification Search
CPC ........... G06N 3/04; G06N 3/045; G06N 3/08; G06N 3/084; H04N 19/117; H04N 19/124;
(Continued)

(56) References Cited

U.S. PATENT DOCUMENTS

| 8,447,128 B2 | 5/2013 | Kameyama |
| 9,247,203 B2 | 1/2016 | Li et al. |

(Continued)

FOREIGN PATENT DOCUMENTS

| EP | 2753075 A1 | 7/2014 |
| JP | 5337970 B2 | 11/2013 |

(Continued)

OTHER PUBLICATIONS

Li, Yue et al. "Learning a Convolutional Neural Network for Image Compact-Resolution." IEEE transactions on image processing 28.3 (2019): 1092-1107. Web. (Year: 2019).*

(Continued)

*Primary Examiner* — William C Vaughn, Jr.
*Assistant Examiner* — Astewaye Gettu Zewede
(74) *Attorney, Agent, or Firm* — Sughrue Mion, PLLC

(57) ABSTRACT

An artificial intelligence (AI) encoding apparatus includes a memory storing one or more instructions, and a processor configured to execute the one or more instructions stored in the memory to identify an object region of interest in an original image, obtain, from the original image, a plurality of original part images respectively including the object region of interest and a non-interest region, obtain a plurality of first images by performing AI scaling on the plurality of original part images through a scaling neural network (NN) that is configured to operate with NN setting information selected from among a plurality of pieces of NN setting information, at least based on whether the plurality of original part images include the object region of interest or (Continued)

the non-interest region, generate image data by encoding the plurality of first images, and transmit the image data, and AI data including information related to the AI scaling.

10 Claims, 24 Drawing Sheets

(58) Field of Classification Search
CPC .... H04N 19/132; H04N 19/167; H04N 19/17; H04N 19/188; H04N 19/59; H04N 19/30; G06T 9/002
USPC .......................................................... 375/240
See application file for complete search history.

(56) References Cited

U.S. PATENT DOCUMENTS

| | | | |
|---|---|---|---|
| 10,448,027 | B2 | 10/2019 | Jun |
| 10,817,985 | B2 | 10/2020 | Kim et al. |
| 11,003,951 | B2 | 5/2021 | Lim et al. |
| 2010/0110298 | A1 | 5/2010 | Knee |
| 2017/0142424 | A1 | 5/2017 | Jun |
| 2017/0316285 | A1 | 11/2017 | Ahmed et al. |
| 2018/0176468 | A1 | 6/2018 | Wang et al. |
| 2019/0373293 | A1* | 12/2019 | Bortman ............. H04N 19/176 |
| 2022/0138904 | A1 | 5/2022 | Kim et al. |

FOREIGN PATENT DOCUMENTS

| | | | |
|---|---|---|---|
| KR | 10-0720003 | B1 | 5/2007 |
| KR | 10-1313335 | B1 | 9/2013 |
| KR | 10-2013-0129471 | A | 11/2013 |
| KR | 10-2017-0056849 | A | 5/2017 |
| KR | 10-2017-0127776 | A | 11/2017 |
| KR | 10-2020-0044652 | A | 4/2020 |
| KR | 10-2020-0044653 | A | 4/2020 |
| KR | 10-2020-0044661 | A | 4/2020 |
| KR | 10-2020-0044662 | A | 4/2020 |
| KR | 20200044661 | A * | 4/2020 |
| KR | 10-2020-0079697 | A | 7/2020 |
| KR | 20200079697 | A * | 7/2020 |
| WO | 2017/149370 | A1 | 9/2017 |
| WO | 2020/080709 | A1 | 4/2020 |

OTHER PUBLICATIONS

Li, Y., et al., "Learning a Convolutional Neural Network for Image Compact-Resolution", IEEE Transactions on Image Processing, vol. 28, Issue 3 (Mar. 2019), pp. 1092-1107, 18 pages. DOI: 10.1109/TIP.2018.2872876.

International Search Report (PCT/ISA/210) issued from the International Searching Authority on Jan. 6, 2022 to International Application No. PCT/KR2021/013363.

Written Opinion (PCT/ISA/237) issued from the International Searching Authority on Jan. 6, 2022 to International Application No. PCT/KR2021/013363.

Jaehwan Kim, et al., "Dynamic frame resizing with convolutional neural network for efficient video compression", Applications of Digital Image Processing XL, Proc. of SPIE, vol. 10396, Sep. 19, 2017, 13 pages, doi: 10.1117/12.2270737.

European Extended Search Report issued Feb. 22, 2024 by the European Patent Office for EP Patent Application No. 21889386.5.

* cited by examiner

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

FIG. 17

| REGION INFORMATION | DNN SETTING INFORMATION |
|---|---|
| OBJECT REGION OF INTEREST (FACE) | A DNN SETTING INFORMATION |
| OBJECT REGION OF INTEREST (TEXT) | B DNN SETTING INFORMATION |
| BOUNDARY REGION | C DNN SETTING INFORMATION |
| NON-INTEREST REGION | D DNN SETTING INFORMATION |

FIG. 19

| 20 | 20 | 20 | 10 | 10 | 10 | 20 | 20 | 20 | 20 |
|----|----|----|----|----|----|----|----|----|----|
| 20 | 20 | 10 | 10 | 10 | 10 | 10 | 20 | 20 | 20 |
| 20 | 20 | 10 | 10 | 10 | 10 | 10 | 20 | 20 | 20 |
| 20 | 10 | 10 | 10 | 10 | 10 | 10 | 20 | 20 | 20 |
| 20 | 10 | 10 | 10 | 10 | 10 | 10 | 20 | 20 | 20 |
| 20 | 10 | 10 | 10 | 10 | 10 | 10 | 20 | 20 | 20 |
| 20 | 10 | 10 | 10 | 10 | 10 | 20 | 20 | 20 | 20 |
| 20 | 20 | 10 | 10 | 20 | 20 | 20 | 20 | 20 | 20 |
| 20 | 20 | 20 | 20 | 20 | 20 | 20 | 20 | 20 | 20 |
| 20 | 20 | 20 | 20 | 20 | 20 | 20 | 20 | 20 | 20 |

1900

ARTIFICIAL INTELLIGENCE (AI) ENCODING APPARATUS AND METHOD AND AI DECODING APPARATUS AND METHOD FOR REGION OF OBJECT OF INTEREST IN IMAGE

CROSS-REFERENCE TO RELATED APPLICATIONS

This application is a bypass continuation application of International Patent Application No. PCT/KR2021/013363, filed on Sep. 29, 2021, which claims priority from Korean Patent Application No. 10-2020-0148696 filed on Nov. 9, 2020, and Korean Patent Application No. 10-2020-0173500 filed on Dec. 11, 2020, in the Korean Intellectual Property Office, the disclosures of which are incorporated herein by reference in their entireties.

TECHNICAL FIELD

The present disclosure relates to image processing. More particularly, the present disclosure relates to a method and apparatus for encoding and decoding an image based on artificial intelligence (AI).

BACKGROUND ART

Images are encoded by using a codec that complies with a data compression standard. For example, the moving picture experts group (MPEG) standard is widely used as a video compression codec. When images are encoded, they are stored on a recording medium or are transmitted via a communication channel as bit streams.

With the development and distribution of hardware for reproducing and storing high-resolution/high-quality images, the demand for codecs that can effectively encode and decode high-resolution/high-quality images is increasing.

SUMMARY

One or more example embodiments of the present disclosure provide an artificial intelligence (AI) encoding apparatus and method, and an AI decoding apparatus and method that encode and decode images based on AI to achieve high compression rates for image data, and reduce the number of bits needed to present an image without significantly degrading the quality of the images.

According to an aspect of the present disclosure, an artificial intelligence (AI) encoding apparatus may include: a memory storing one or more instructions; and a processor configured to execute the one or more instructions stored in the memory to identify an object region of interest in an original image, obtain, from the original image, a plurality of original part images respectively including the object region of interest and a non-interest region, obtain a plurality of first images by performing AI scaling on the plurality of original part images through a scaling neural network (NN) that is configured to operate with NN setting information selected from among a plurality of pieces of NN setting information, at least based on whether the plurality of original part images include the object region of interest or the non-interest region, generate image data by encoding the plurality of first images, and transmit the image data, and AI data including information related to the AI scaling.

Different pieces of NN setting information may be respectively selected for the plurality of original part images, and the scaling NN that operates with the NN setting information may be configured to change sizes of the plurality of original part images at different magnifications.

A size of any one original part image from among the plurality of original part images may decrease through the scaling NN. A size of another original part image from among the plurality of original part images may increase through the scaling NN.

The one original part image includes the non-interest region, and the other original part image includes the object region of interest.

The processor may be further configured to: determine quantization parameters corresponding to the object region of interest and the non-interest region, respectively, and encode the plurality of first images based on the determined quantization parameters.

The processor may be further configured to identify a boundary region located between the object region of interest and the non-interest region in the original image, and obtain, from the original image, the plurality of original part images respectively including the object region of interest, the non-interest region, and the boundary region.

A size change magnification of the original part image including a boundary area through the AI scaling may have a value between a size change magnification of the original part image including the object region of interest through the AI scaling and a size change magnification of the original part image including the non-interest region through the AI scaling.

The memory may store a plurality of neural network parameter sets as the plurality of pieces of NN setting information. The plurality of original part images may include a first part image including the object region of interest, and a second part image including the non-interest region. The processor may be further configured to: select a first neural network parameter set from the plurality of neural network parameter sets, configure the scaling NN with the first neural network parameter set, and obtain a scaled-first part image by performing AI scaling on the first part image using the scaling NN configured with the first neural network parameter set; and select a second neural network parameter set from the plurality of neural network parameter sets, configure the scaling NN with the second neural network parameter set, and obtain a scaled-second part image by performing AI scaling on the second part image using the scaling NN configured with the second neural network parameter set. The plurality of first images may include the scaled-first part image and the scaled-second part image.

According to another aspect of the present disclosure, an artificial intelligence (AI) decoding apparatus may include: a memory storing one or more instructions; and a processor configured to execute the one or more instructions stored in the memory to obtain image data generated as a result of encoding a plurality of first images, and AI data related to AI scaling from a plurality of original part images to the plurality of first images, obtain a plurality of second images by decoding the image data, obtain, based on the AI data, neural network (NN) setting information for AI scaling of the plurality of second images from among a plurality of pieces of NN setting information, generate a plurality of third images by performing AI scaling on the plurality of second images through a scaling NN that is configured to operate with the obtained NN setting information, and obtain a reconstructed image by combining the plurality of third images.

The plurality of original part images may be images cropped from an original image.

Different pieces of NN setting information may be respectively obtained for the plurality of second images. Sizes of the plurality of second images may be changed at different magnifications through the scaling NN operating with the NN setting information.

A size of any one second image from among the plurality of second images may increase through the scaling NN, and a size of another second image from among the plurality of second images may decrease through the scaling NN.

The other second image may include the object region of interest identified in the original image.

The memory stores a plurality of neural network parameter sets as the plurality of pieces of NN setting information, and wherein the processor is further configured to: based on the AI data, select a first neural network parameter set from the plurality of neural network parameter sets, configure the scaling NN with the first neural network parameter set, and obtain one of the third images by performing AI scaling on one of the plurality of second images using the scaling NN configured with the first neural network parameter set; and select a second neural network parameter set from the plurality of neural network parameter sets, configure the scaling NN with the second neural network parameter set, and obtain another one of the third images by performing AI scaling on another one of the plurality of second images using the scaling NN configured with the second neural network parameter set.

According to another aspect of the present disclosure, an artificial intelligence (AI) encoding method performed by an AI encoding apparatus, may include: identifying an object region of interest in an original image; obtaining, from the original image, a plurality of original part images respectively including the object region of interest and a non-interest region; obtaining a plurality of first images by performing AI scaling on the plurality of original part images through a scaling deep neural network (NN) that is configured to operate with NN setting information selected from among a plurality of pieces of NN setting information, at least based on whether the plurality of original part images include the object region of interest or the non-interest region; generating image data by encoding the plurality of first images; and transmitting the image data, and AI data including information related to the AI scaling.

According to another aspect of the present disclosure, an artificial intelligence (AI) decoding method performed by an AI decoding apparatus, may include: obtaining image data generated as a result of encoding a plurality of first images, and AI data related to AI scaling from a plurality of original part images to the plurality of first images; obtaining a plurality of second images by decoding the image data; obtaining, based on the AI data, neural network (NN) setting information for AI scaling of the plurality of second images from among a plurality of pieces of NN setting information; generating a plurality of third images obtained by performing AI scaling on the plurality of second images through a scaling NN that is configured to operate with the obtained NN setting information; and obtaining a reconstructed image by combining the plurality of third images.

According to another aspect of the present disclosure, a non-transitory computer-readable recording medium storing a program for executing the AI encoding method may be provided.

BRIEF DESCRIPTION OF THE DRAWINGS

The above and/or other aspects will be more apparent by describing certain example embodiments, with reference to the accompanying drawings, in which:

FIG. 5 is a table showing a mapping relationship between multiple pieces of image-related information and multiple pieces of DNN setting information;

FIG. 17 is a diagram illustrating a mapping relationship between types of regions included in an original part image and pieces of DNN setting information;

FIG. 19 is a diagram illustrating a quantization parameter map obtained from region information;

DETAILED DESCRIPTION

Figure 1:
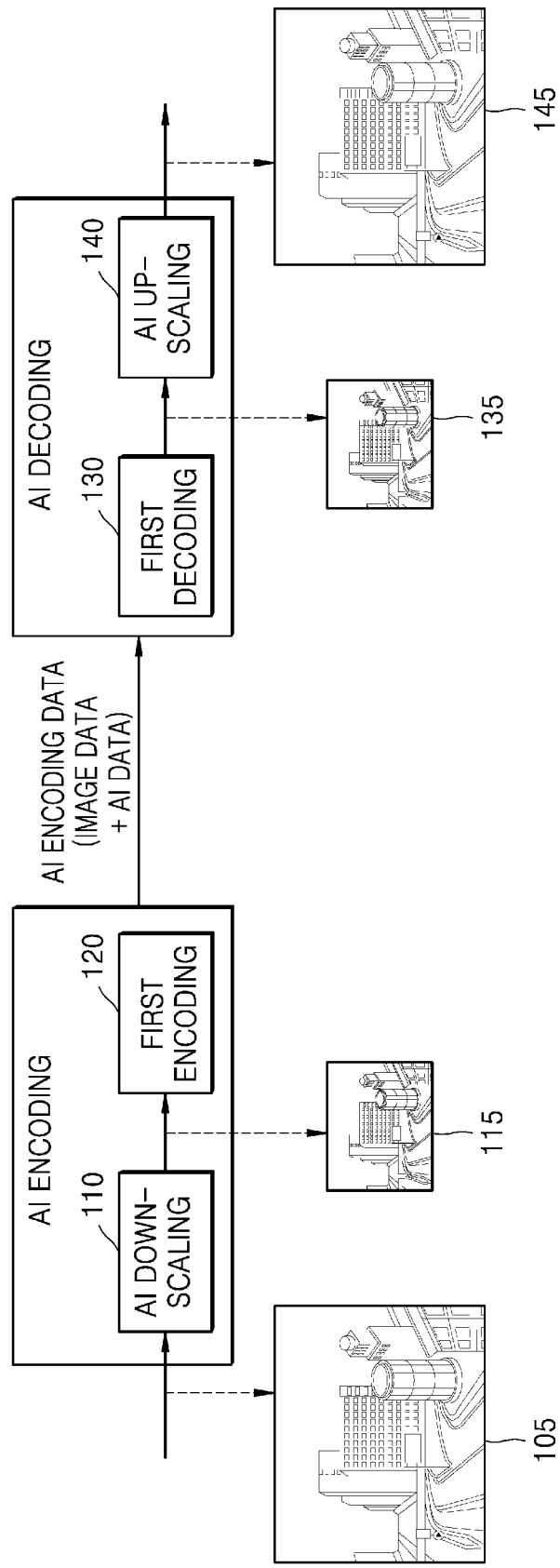
FIG. 1 is a diagram for describing an artificial intelligence (AI) encoding process and an AI decoding process, according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a 'unit' or a 'module', two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the specification, an 'image' or a 'picture' may refer to a still image, a moving image including a plurality of consecutive still images (or frames), or a video.

Also, in the specification, a 'deep neural network (DNN)' is a representative example of an artificial neural network model simulating brain nerves, and is not limited to an artificial neural network model using a specific algorithm.

Also, in the specification, a 'parameter' refers to a value used in an operation process of each layer constituting a neural network, and, for example, may include a weight and a bias which are used when an input value is applied to a certain operation expression. The parameter may be expressed in a matrix form. The parameter is a value set as a result of training, and may be updated by using separate training data.

Also, in the specification, a 'first DNN' refers to a DNN used for AI downscaling of an image, and a 'second DNN' refers to a DNN used for AI upscaling of an image.

Also, in the specification, 'DNN setting information' refers to information related to elements constituting a DNN, including a parameter. The first DNN or the second DNN may be set by using the DNN setting information.

Also, in the specification, an 'original image' refers to an image on which AI encoding is to be performed, and a 'first image' refers to an image obtained as a result of performing AI downscaling on the original image during an AI encoding process. Also, a 'second image' refers to an image obtained through first decoding during an AI decoding process, and a 'third image' refers to an image obtained by performing AI upscaling on the second image during the AI decoding process.

Also, in the specification, 'AI downscaling' refers to a process of reducing a resolution of an image based on AI, and 'first encoding' refers to encoding using a frequency transformation-based image compression method. Also, 'first decoding' refers to decoding using a frequency transformation-based image reconstruction method, and 'AI upscaling' refers to a process of increasing a resolution of an image based on AI.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

FIG. 1 is a diagram for describing an AI encoding process and an AI decoding process, according to an embodiment.

As a resolution of an image rapidly increases, the amount of information to be processed for encoding/decoding increases. Accordingly, there is a need for a method of improving the efficiency of image encoding and decoding, particularly for high-resolution images.

As shown in FIG. 1, according to an embodiment of the present disclosure, a first image 115 is obtained by performing AI downscaling 110 on an original image 105 having a high resolution. Because first encoding 120 and first decoding 130 are performed on the first image 115 having a relatively low resolution, a bitrate may be greatly reduced, compared to a case where the first encoding 120 and the first decoding 130 are performed on the original image 105.

In detail, referring to FIG. 1, in an embodiment, during an AI encoding process, the first image 115 is obtained by performing the AI downscaling 110 on the original image, and the first encoding 120 is performed on the first image 115. During an AI decoding process, AI encoding data including AI data and image data obtained as a result of AI encoding is received, a second image 135 is obtained through the first decoding 130, and a third image 145 is obtained by performing AI upscaling 140 on the second image 135.

Referring to the AI encoding process in detail, when the original image 105 is received, the AI downscaling 110 is performed on the original image 105 to obtain the first image 115 having a certain resolution and/or a certain image quality. In this case, the AI downscaling 110 is performed based on AI. The AI for the AI downscaling 110 should be jointly trained with AI for the AI upscaling 140 of the second image 135. This is because, when the AI for the AI downscaling 110 and the AI for the AI upscaling 140 are separately trained, a difference between the original image 105 to be AI encoded and the third image 145 reconstructed through AI decoding increases.

In an embodiment of the present disclosure, AI data may be used to maintain such a joint relationship during the AI encoding process and the AI decoding process. Accordingly, AI data obtained through the AI encoding process should include information indicating an upscaling target, and during the AI decoding process, the AI upscaling 140 should be performed on the second image 135 according to the upscaling target identified based on the AI data.

The AI for the AI downscaling 110 and the AI for the AI upscaling 140 may each be implemented as a deep neural network (DNN). As described below with reference to FIG. 11, because a first DNN and a second DNN are jointly trained by sharing loss information under a certain target, an AI encoding apparatus may provide target information used to jointly train the first DNN and the second DNN to an AI decoding apparatus, and the AI decoding apparatus may perform the AI upscaling 140 on the second image 135 to a target image quality and/or resolution based on the received target information.

Referring to the first encoding 120 and the first decoding 130 of FIG. 1 in detail, the amount of information of the first image 115 obtained by performing the AI downscaling 110 on the original image 105 may be reduced through the first encoding 120. The first encoding 120 may include a process of generating prediction data by predicting the first image 115, a process of generating residual data corresponding to a difference between the first image 115 and the prediction data, a process of transforming the residual data that is a spatial domain component into a frequency domain component, a process of quantizing the residual data transformed into the frequency domain component, and a process of entropy-encoding the quantized residual data. The first encoding 120 may be performed through one of image compression methods using frequency transformation, such as MPEG-2, H.264 advanced video coding (AVC), MPEG-4, high efficiency video coding (HEVC), VC-1, VP8, VP9, and AOMedia video 1 (AV1).

The second image 135 corresponding to the first image 115 may be reconstructed through the first decoding 130 on image data. The first decoding 130 may include a process of generating quantized residual data by entropy-decoding the image data, a process of inverse-quantizing the quantized residual data, a process of transforming the residual data from a frequency domain component into a spatial domain component, a process of generating a prediction data, and a process of reconstructing the second image 135 by using the prediction data and the residual data. The first decoding 130 may be performed through an image reconstruction method corresponding to one of image compression methods using frequency transformation, such as MPEG-2, H.264, MPEG-4, HEVC, VC-1, VP8, VP9, and AV1 used in the first encoding 120.

The AI encoding data obtained through the AI encoding process may include image data obtained as a result of performing the first encoding 120 on the first image 115 and AI data related to the AI downscaling 110 of the original image 105. The image data may be used during the first decoding 130, and the AI data may be used during the AI upscaling 140.

The image data may be transmitted as a bitstream. The image data may include data obtained based on pixel values in the first image 115, for example, residual data that is a difference between the first image 115 and prediction data of the first image 115. Also, the image data includes pieces of information used during the first encoding 120 of the first image 115. For example, the image data may include prediction mode information used to perform the first encoding 120 on the first image, motion information, and quantization parameter-related information used during the first encoding 120. The image data may be generated according to rules, for example, syntax, of an image compression method used during the first encoding 120 from among image compression methods using frequency transformation, such as MPEG-2, H.264 AVC, MPEG-4, HEVC, VC-1, VP8, VP9, and AV1.

The AI data is used during the AI upscaling 140 based on the second DNN. As described above, because the first DNN and the second DNN are jointly trained, the AI data includes information based on which the AI upscaling 140 may be accurately performed on the second image 135 through the second DNN. During the AI decoding process, the AI upscaling 140 may be performed on the second image 135 to a target resolution and/or a target image quality based on the AI data.

The AI data may be transmitted as a bitstream, along with the image data. According to an implementation, the AI data may be transmitted as a frame or packet, separately from the image data. Alternatively, according to an implementation, the AI data may be included in the image data and may be transmitted. The image data and the AI data may be transmitted via the same network or different networks.

Figure 2:
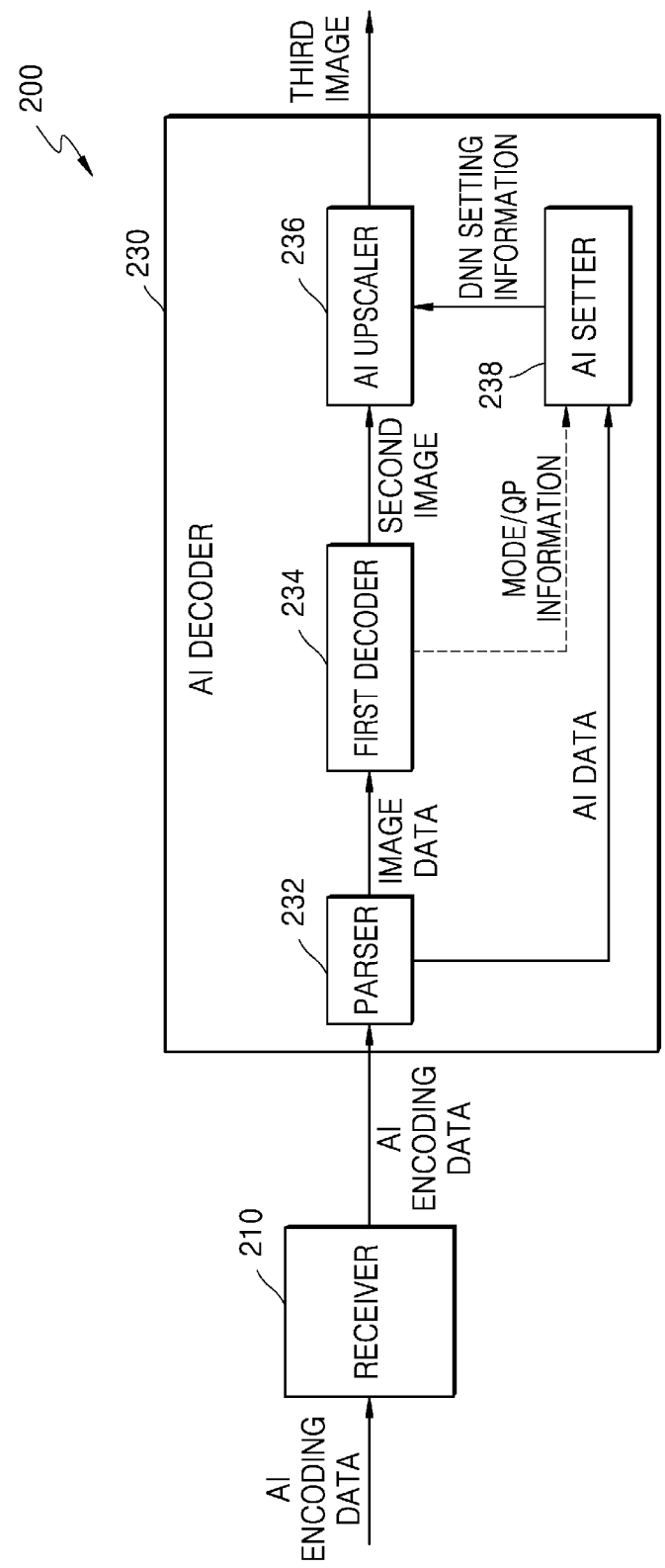
FIG. 2 is a block diagram illustrating a configuration of an AI decoding apparatus, according to an embodiment.

FIG. 2 is a block diagram illustrating a configuration of an AI decoding apparatus 200, according to an embodiment.

Referring to FIG. 2, the AI decoding apparatus 200 according to an embodiment includes a receiver 210 and an AI decoder 230. The AI decoder 230 may include a parser 232, a first decoder 234, an AI upscaler 236, and an AI setter 238.

Although the receiver 210 and the AI decoder 230 are illustrated as individual devices in FIG. 2, the receiver 210 and the AI decoder 230 may be implemented as one processor. In this case, the receiver 210 and the AI decoder 230 may be implemented as a dedicated processor, or may be implemented through a combination of software (S/W) and a general-purpose processor such as an application processor (AP), a central processing unit (CPU), or a graphics processing unit (GPU). Also, when the receiver 210 and the AI decoder 230 are implemented as a dedicated processor, the dedicated processor may include a memory for implementing an embodiment of the present disclosure or a memory processor for using an external memory.

The receiver 210 and the AI decoder 230 may include a plurality of processors. In this case, the receiver 210 and the AI decoder 230 may be implemented through a combination of dedicated processors, or a combination of S/W and multiple general-purpose processors such as an AP, a CPU, and a GPU. In an embodiment, the receiver 210 may be implemented as a first processor, the first decoder 234 may be may be implemented as a second processor that is different from the first processor, and the parser 232, the AI upscaler 236, and the AI setter 238 may be implemented as a third processor that is different from the first processor and the second processor.

The receiver 210 receives AI encoding data obtained as a result of AI encoding. For example, the AI encoding data may be a video file having a file format such as mp4 or mov.

The receiver 210 may receive the AI encoding data transmitted through a network. The receiver 210 outputs the AI encoding data to the AI decoder 230.

In an embodiment, the AI encoding data may be obtained from any of data storage media including a magnetic medium such as a hard disk, a floppy disk, or a magnetic tape, an optical recording medium such as a compact disc-read only memory (CD-ROM) or a digital versatile disk (DVD), and a magneto-optical storage medium such as a floptical disk.

The parser 232 parses the AI encoding data and respectively transmits image data and AI data generated as a result of performing first encoding on the first image 115 to the first decoder 234 and the AI setter 238.

In an embodiment, the parser 232 may parse the AI data and the image data which are separately included in the AI encoding data. The parser 231 may distinguish the AI data from the image data included in the AI encoding data by reading a header in the AI encoding data. In an embodiment, the AI data may be included in a vendor specific infoframe (VSIF) in a high-definition multimedia interface (HDMI)) stream. A structure of the AI encoding data including the AI data and the image data which are separated from each other will be described below with reference to FIG. 9.

In another embodiment, the parser 232 may parse the image data in the AI encoding data, may extract the AI data from the image data, may transmit the AI data to the AI setter 238, and may transmit the rest of the image data to the first decoder 234. That is, the AI data may be included in the image data. For example, the AI data may be included in supplemental enhancement information (SEI) that is an additional information area of a bitstream corresponding to the image data. A structure of the AI encoding data including the image data including the AI data will be described below with reference to FIG. 10.

In another embodiment, the parser 232 may divide a bitstream corresponding to the image data into a bitstream to be processed by the first decoder 234 and a bitstream corresponding to the AI data, and may respectively output the bitstreams to the first decoder 234 and the AI setter 238.

The parser may identify that the image data included in the AI encoding data is image data obtained via a certain codec (e.g., MPEG-2, H.264, MPEG-4, HEVC, VC-1, VP8, VP9, or AV1). In this case, corresponding information may be transmitted to the first decoder 234 so that the image data is processed via the identified codec.

The first decoder 234 reconstructs the second data 135 corresponding to the first image 115 based on the image data received from the parser 232. The second image 135 obtained by the first decoder 234 is provided to the AI upscaler 236.

According to an implementation, first decoding-related information such as prediction mode information, motion information, and quantization parameter information may be provided from the first decoder 234 to the AI setter 238. The first decoding-related information may be used to obtain DNN setting information.

The AI data provided to the AI setter 238 includes pieces of information for performing AI upscaling on the second image 135. In this case, an upscaling target of the second image 135 should correspond to a downscaling target of a first DNN. Accordingly, the AI data should include information for identifying the downscaling target of the first DNN.

Examples of the pieces of information included in the AI data include difference information between a resolution of the original image 105 and a resolution of the first image 115, and information related to the first image 115.

The difference information may be represented as information (e.g., information about a resolution conversion ratio) about a degree of resolution conversion of the first image 115 with respect to the original image 105. Because a resolution of the first image 115 may be determined from a resolution of the reconstructed second image 135, and thus, a degree of resolution conversion may be determined through the resolution of the first image 115, the difference information may be represented only as resolution information of the original image 105. The resolution information may be expressed as a screen size (width/height), or may be expressed as a ratio (e.g., 16:9 or 4:3) and a size of one axis. Also, there is preset resolution information, the resolution information may be expressed as an index or a flag.

The information related to the first image 115 may include information about at least one of a resolution of the first image 115, a bitrate of the image data obtained as a result of performing first encoding on the first image 115, and a type of a codec used during the first encoding of the first image 115.

The AI setter 238 may determine an upscaling target of the second image 135 based on at least one of the difference information and the information related to the first image 115 included in the AI data. The upscaling target may indicate, for example, to which resolution the second image 135 should be upscaled.

When the upscaling target is determined, the AI upscaler 236 performs AI upscaling on the second image 135 through a second DNN to obtain the third image 145 corresponding to the upscaling target.

Before a method by which the AI setter 238 determines the upscaling target based on the AI data is described, a method of performing AI upscaling through the second DNN will be described with reference to FIGS. 3 and 4.

Figure 3:
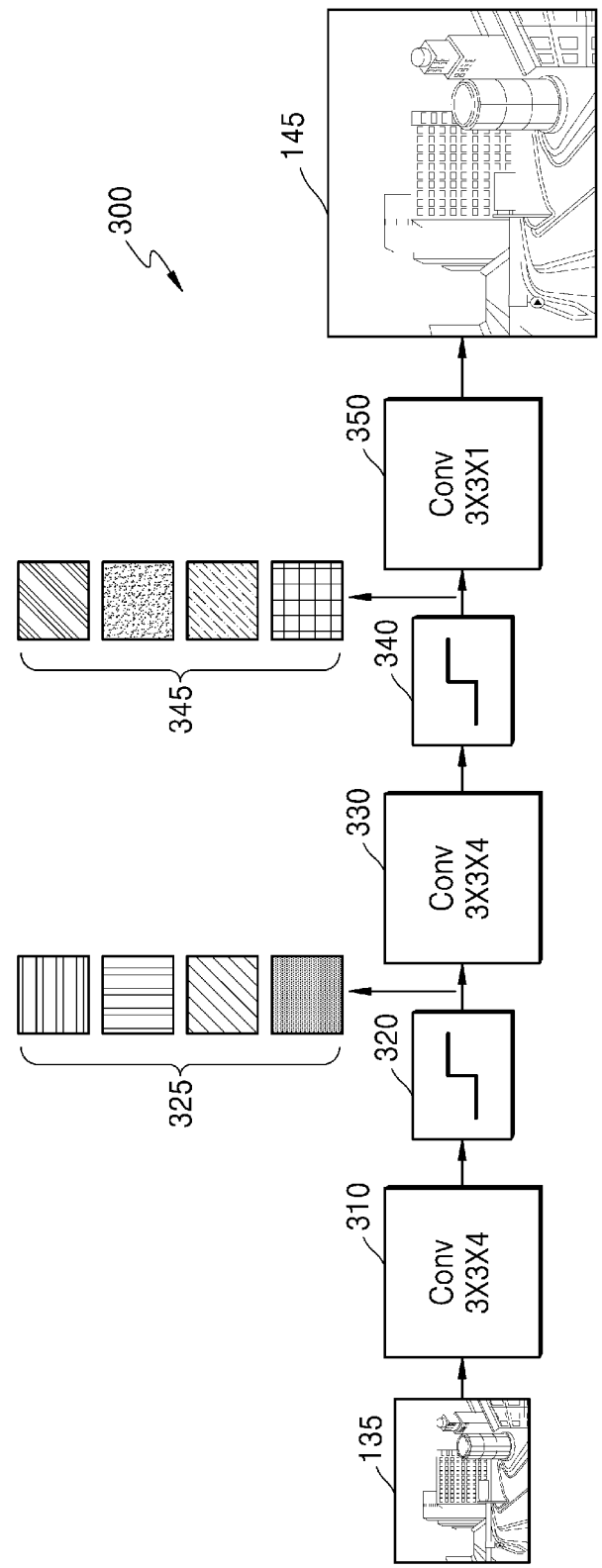
FIG. 3 is a diagram illustrating a second deep neural network (DNN) for performing AI upscaling on a second image.

FIG. 3 is a diagram illustrating a second DNN 300 for performing AI upscaling on the second image 135. FIG. 4 is a diagram illustrating a convolution operation at a first convolution layer 310 of FIG. 3.

As shown in FIG. 3, the second image 135 is input to the first convolution layer 310. 3×3×4 in the first convolution layer 310 of FIG. 3 indicates that a convolution operation is performed on one input image by using four filter kernels having a size of 3×3. Four feature maps are generated by the four filter kernels as a result of the convolution operation. Each feature map represents unique features of the second image 135. For example, each feature map may represent features in a vertical direction, features in a horizontal direction, or edge features of the second image 135.

A convolution operation at the first convolution layer 310 will be described in detail with reference to FIG. 4.

One feature map 450 may be generated by performing multiplication and addition between parameters of a filter kernel 430 having a size of 3×3 used in the first convolution layer 310 and pixel values in the second image 135 corresponding to the parameters. Because four filter kernels are used in the first convolution layer 310, four feature maps may be generated through convolution operations using the four filter kernels.

Figure 4:
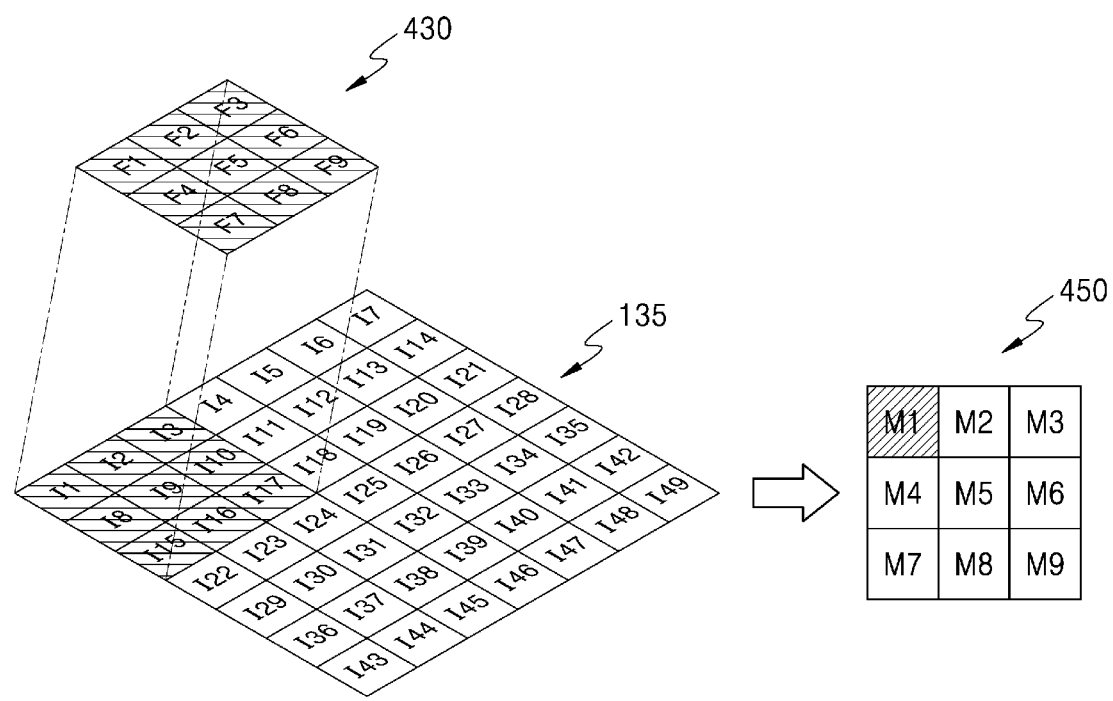
FIG. 4 is a diagram for describing a convolution operation at a convolution layer.

I1 to I49 on the second image 135 in FIG. 4 represent pixels of the second image 135, and F1 to F9 on the filter kernel 430 represent parameters of the filter kernel 430. Also, M1 to M9 on the feature map 450 represent samples of the feature map 450.

Although the second image 135 includes 49 pixels in FIG. 4, this is merely an example, and when the second image 135 has a resolution of 4K, the second image 135 may include, for example, 3840×2160 pixels.

During a convolution operation, multiplication may be performed between values of the pixels I1, I2, I3, I8, I9, I10, I15, I16, and I17 in the second image 135 and the parameters F1, F2, F3, F4, F5, F6, F7, F8, and F9 of the filter kernel 430, and a value obtained by combining (e.g., adding) results of the multiplication may be assigned as a value of M1 in the feature map 450. When a stride of the convolution operation is 2, multiplication may be performed between values of the pixels I3, I4, I5, I10, I11, I12, I17, I18, and I19 of the second image 135 and the parameters F1, F2, F3, F4, F5, F6, F7, F8, and F9 of the filter kernel 430, and a value obtained by combining results of the multiplication as a value of M2 in the feature map 450.

When the convolution operation is performed between values of the pixels in the second image 135 and the parameters of the filter kernel 430 while the filter kernel 430 moves by the stride to a last pixel in the second image 135, the feature map 450 having a certain size may be obtained.

According to the present disclosure, values of parameters of a second DNN, for example, parameters of a filter kernel used in convolution layers of the second DNN (e.g., F1, F2, F3, F4, F5, F6, F7, F8, and F9 of the filter kernel 430) may be optimized through joint training of a first DNN and the second DNN. The AI setter 238 may determine an upscaling target corresponding to a downscaling target of the first DNN based on AI data, and may determine parameters corresponding to the determined upscaling target as parameters of a filter kernel used in convolution layers of the second DNN.

Although convolution layers included in the first DNN and the second DNN may perform operations according to a convolution operation described with reference to FIG. 4, the convolution operation described with reference to FIG. 4 is merely an example, and the present disclosure is not limited thereto.

Referring back to FIG. 3, feature maps output from the first convolution layer 310 are input to a first activation layer 320.

The first activation layer 3210 may apply non-linear features to each feature map. The first activation layer 320 may include, but is not limited to, a sigmoid function, a Tan h function, or a rectified linear unit (ReLU) function.

When the first activation layer 320 applies non-linear features, it means that some sample values of a feature map, which is an output of the first convolution layer 310, are changed and output. In this case, the change is performed by applying the non-linear features.

The first activation layer 320 determines whether to transmit, to a second convolution layer 330, sample values of the feature maps output from the first convolution layer 310. For example, some of the sample values of the feature maps are activated by the first activation layer 320 and are transmitted to the second convolution layer 330, and other sample values are deactivated by the first activation layer 320 and are not transmitted to the second convolution layer 330. The unique features of the second image 135 indicated by the feature maps are emphasized by the first activation layer 320.

Feature maps 325 output from the first activation layer 320 are input to the second convolution layer 330. Any one of the feature maps 325 of FIG. 3 is a result of processing the feature map 450 described with reference to FIG. 4 at the first activation layer 320.

3×3×4 in the second convolution layer 330 indicates that a convolution operation is performed on the feature maps 325 input by using four filter kernels having a size of 3×3. An output of the second convolution layer 330 is input to a second activation layer 340. The second activation layer 340 may apply non-linear features to input data.

Feature maps 345 output from the second activation layer 340 are input to a third convolution layer 350. 3×3×1 in the third convolution layer 350 of FIG. 3 indicates that a convolution operation is performed to generate one output image by using one filter kernel having a size of 3×3. The third convolution layer 350 is a layer for outputting a final image and generates one output by using one filter kernel. According to an example of the present disclosure, the third convolution layer 350 may output the third image 145 through a convolution operation.

There may be a plurality of pieces of DNN setting information each indicating the number of filter kernels of the first convolution layer 310, the second convolution layer 330, and the third convolution layer 350 of the second DNN 300, parameters of each filter kernel, etc. as described below. The plurality of pieces of DNN setting information should be jointly trained with a plurality of pieces of DNN setting information of a first DNN. A joint relationship between the plurality of pieces of DNN setting information of the second DNN and the plurality of pieces of DNN setting information of the first DNN may be implemented through joint training between the first DNN and the second DNN.

Although the second DNN 300 includes three convolution layers (the first to third convolution layers 310, 330, and 350) and two activation layers (the first and second activation layers 320 and 340) in FIG. 3, this is merely an example, and the number of convolution layers and activation layers may vary according to an implementation. Also, according to an implementation, the second DNN 300 may be implemented through a recurrent neural network (RNN). In this case, a CNN structure of the second DNN 300 according to an example of the present disclosure is changed to an RNN structure.

In an embodiment, the AI upscaler 236 may include at least one arithmetic logic unit (ALU) for a convolution operation and an arithmetic operation at each activation layer. The ALU may be implemented as a processor. For the convolution operation, the ALU may include a multiplier that performs multiplication between sample values of the second image 135 or a feature map output from a previous layer and sample values of a filter kernel and an adder that adds results of the multiplication. Also, for the arithmetic operation at each activation layer, the ALU may include a multiplier that multiplies an input sample value by a pre-determined weight used in a sigmoid function, a Tan h function, or an ReLU function, and a comparator that compares a result of the multiplication with a certain value to determine whether to transmit the input sample value to a next layer.

A method by which the AI setter 238 determines an upscaling target and the AI upscaler 236 performs AI upscaling on the second image 135 according to the upscaling target will be described.

In an embodiment, the AI setter 238 may store a plurality of pieces of DNN setting information settable in the second DNN.

The DNN setting information may include information about at least one of the number of convolution layers included in the second DNN, the number of filter kernels for each convolution layer, and parameters of each filter kernel.

The plurality of pieces of DNN setting information may respectively correspond to various upscaling targets, and the second DNN may operate based on DNN setting information corresponding to a specific upscaling target. The second DNN may have different structures according to DNN setting information. For example, the second DNN may include three convolution layers according to any DNN setting information, and may include four convolution layers according to another DNN setting information.

In an embodiment, DNN setting information may include only parameters of each filter kernel used in the second DNN. In this case, a structure of the second DNN may not change, and only parameters of each filter kernel in the second DNN may change according to the DNN setting information.

The AI setter 238 may obtain DNN setting information for performing AI upscaling on the second image 135 from among the plurality of pieces of DNN setting information. Each of the plurality of pieces of DNN setting information used in this case is information for obtaining the third image 145 having a pre-determined resolution and/or a pre-determined image quality, and is obtained through joint training with the first DNN.

For example, any one DNN setting information from among the plurality of pieces of DNN setting information may include pieces of information for obtaining the third image 145 having a resolution that is twice a resolution of the second image 135, for example, the third image 145 having a resolution of 4K (4096*2160) that is twice 2K (2048*1080) that is a resolution of the second image 135, and another DNN setting information may include pieces of information for obtaining the third image 145 having a resolution that is four times a resolution of the second image 135, for example, the third image 145 having a resolution of 8K (8192*4320) that is four times 2K (2048*1080) that is a resolution of the second image 135.

Each of the plurality of pieces of DNN setting information is jointly generated or obtained with DNN setting information of the first DNN of an AI encoding apparatus 700, and the AI setter 238 obtains one DNN setting information from among the plurality of pieces of DNN setting information according to an enlargement ratio corresponding to a reduction ratio of the DNN setting information of the first DNN. To this end, the AI setter 238 should identify information of the first DNN. In order for the AI setter 238 to identify the information of the first DNN, the AI decoding apparatus 200 according to an embodiment receives AI data including the information of the first DNN from the AI encoding apparatus 700.

In other words, the AI setter 238 may identify information targeted by DNN setting information of the first DNN used to obtain the first image 115, by using pieces of information received from the AI encoding apparatus 700, and may obtain DNN setting information of the second DNN jointly trained with the DNN setting information of the first DNN.

When DNN setting information is obtained for performing AI upscaling on the second image 135 is obtained from among the plurality of pieces of DNN setting information, the DNN setting information may be transmitted to the AI upscaler 236 and input data may be processed based on the second DNN operating according to the DNN setting information.

For example, when any one DNN setting information is obtained, the AI upscaler 236 sets the number of filter kernels included in each of the first convolution layer 310, the second convolution layer 330, and the third convolution layer 350 of the second DNN 300 of FIG. 3, and parameters of each filter kernel as values included in the obtained DNN setting information.

In detail, when parameters of a filter kernel having a size of 3×3 used in any one convolution layer of the second DNN of FIG. 4 are {1, 1, 1, 1, 1, 1, 1, 1, 1} and the DNN setting information is changed, the AI upscaler 236 may replace the parameters of the filter kernel with {2, 2, 2, 2, 2, 2, 2, 2, 2} that are parameters included in the changed DNN setting information.

The AI setter 238 may obtain DNN setting information for performing upscaling on the second image 135 from among the plurality of pieces of DNN setting information based on information included in AI data, and the AI data used to obtain the DNN setting information will be described in detail.

In an embodiment, the AI setter 238 may obtain DNN setting information for performing upscaling on the second image 135 from among the plurality of pieces of DNN setting information based on difference information included in the AI data. For example, when it is determined based on the difference information that a resolution (e.g., 4K (4096*2160)) of the original image 105 is twice a resolution (e.g., 2K (2048*1080)) of the first image 115, the AI setter 238 may obtain DNN setting information for doubling the resolution of the second image 135.

In another embodiment, the AI setter 238 may obtain DNN setting information for performing AI upscaling on the second image 135 from among the plurality of pieces of DNN setting information, based on information related to the first image 115 included in the AI data. The AI setter 238 may pre-determine a mapping relationship between pieces of image-related information and pieces of DNN setting information, and may obtain DNN setting information mapped to information related to the first image 115.

FIG. 5 is a table showing a mapping relationship between multiple pieces of image-related information and multiple pieces of DNN setting information. The multiple pieces of DNN setting information may refer to a plurality of neural network parameter sets, wherein each of the plurality of neural network parameter sets may include weights and biases. The multiple pieces of DNN setting information may be pre-stored in an encoding device and a decoding device, but the embodiments of the present disclosure are not limited thereto, and the multiple pieces of DNN setting information may be acquired from an external device.

Through an embodiment of FIG. 5, it is found that AI encoding/AI decoding processes of an embodiment of the present disclosure do not consider only a change in a resolution. As shown in FIG. 5, DNN setting information may be selected individually or comprehensively considering a resolution such as standard definition (SD), high definition (HD), or full HD, a bitrate such as 10 Mbps, 15 Mbps, or 20 Mbps, and codec information such as AV1, H.264, or HEVC. For such consideration, in an AI training process, training considering the respective factors should be jointly performed in encoding and decoding processes during an AI training process (see FIG. 11).

Accordingly, according to training details, as shown in FIG. 5, when a plurality of pieces of DNN setting information are provided based on image-related information including a codec type and a resolution of an image, DNN setting information for performing AI upscaling ON the second image 135 may be obtained based on information related to the first image 115 received during an AI decoding process.

That is, the AI setter 238 may use DNN setting information according to image-related information by matching the image-related information shown on the left side of Table of FIG. 5 to the DNN setting information on the right side of Table of FIG. 5.

As shown in FIG. 5, when it is determined from information related to the first image 115 that a resolution of the first image 115 is SD, a bitrate of image data obtained as a result of performing first encoding on the first image 115 is 10 Mbps, and the first encoding is performed on the first image 115 via an AV1 codec, the AI setter 238 may obtain DNN setting information A from among the plurality of pieces of DNN setting information.

When it is determined from the information related to the first image 115 that a resolution of the first image 115 is HD, a bitrate of image data obtained as a result of performing first encoding on the first image 115 is 15 Mbps, and the first encoding is performed on the first image 115 via an h.264 codec, the AI setter 238 may obtain DNN setting information B from among the plurality of pieces of DNN setting information.

When it is determined from the information related to the first image 115 that a resolution of the first image 115 is full HD, a bitrate of image data obtained as a result of performing first encoding on the first image 115 is 20 Mbps, and the first encoding is performed on the first image 115 via an HEVC codec, the AI setter 238 may obtain DNN setting information C from among the plurality of pieces of DNN setting information. When it is determined from the information related to the first image 115 that a resolution of the first image 115 is full HD, a bitrate of image data obtained as a result of performing first encoding on the first image 115 is 15 Mbps, and the first encoding is performed on the first image 115 via an HEVC codec, the AI setter 238 may obtain DNN setting information D from among the plurality of pieces of DNN setting information. Any one of the DNN setting information C and the DNN setting information D is selected according to whether a bitrate of image data obtained as a result of performing first encoding on the first image 115 is 20 Mbps or 15 Mbps. When first encoding is performed on the first image 115 having the same resolution via the same codec different bitrates of obtained image data indicate different qualities of reconstructed images. Accordingly, a first DNN and a second DNN may be jointly trained based on a certain image quality, and thus, the AI setter 238 may obtain DNN setting information according to a bitrate of image data, indicating an image quality of the second image 135.

In another embodiment, the AI setter 238 may obtain DNN setting information for performing AI upscaling on the second image 135 from among the plurality of pieces of DNN setting information by considering both information (prediction mode information, motion information, and quantization parameter information) provided from the first decoder 234 and information related to the first image 115 included in AI data. For example, the AI setter 238 may receive quantization parameter information used during a first encoding process performed on the first image 115 from the first decoder 234, may identify a bitrate of image data obtained as a result of the encoding of the first image 115 from AI data, and may obtain DNN setting information corresponding to the quantization parameter information and the bitrate. Image qualities of reconstructed images may be different according to a complexity of images even when bitrates of image data are the same, and because a bitrate is a representative value of the entire first image 115 on which first encoding is performed, an image quality of each frame may be different even within the first image 115. Accordingly, DNN setting information more suitable for the second image 135 may be obtained when considering, together with AI data, prediction mode information, motion information, and/or quantization parameters which may be obtained for each frame from the first decoder 234, compared to when using only the AI data.

Also, according to an implementation, the AI data may include an identifier of DNN setting information that is mutually agreed. An identifier of DNN setting information is an upscaling target corresponding to a downscaling target of the first DNN, and is information for distinguishing a pair of pieces of DNN setting information obtained through joint training between the first DNN and the second DNN so that AI upscaling is performed on the second image 135. The AI setter 238 may obtain an identifier of DNN setting information included in AI data, and then may obtain the DNN setting information corresponding to the identifier of the DNN setting information, and the AI upscaler 236 may perform AI upscaling on the second image 135 by using the DNN setting information corresponding to the identifier. For example, identifiers respectively indicating a plurality of pieces of DNN setting information settable in the first DNN and identifiers respectively indicating a plurality of pieces of DNN setting information settable in the second DNN may be pre-designated. In this case, the same identifier may be designated for a pair of pieces of DNN setting information respectively settable in the first DNN and the second DNN. The AI data may include an identifier of DNN setting information set in the first DNN for AI downscaling of the original image 105. The AI setter 238 receiving the AI data may obtain DNN setting information indicated by an identifier included in the AI data from among the plurality of pieces of DNN setting information, and the AI upscaler 236 may perform AI upscaling on the second image 135 by using the DNN setting information.

Also, according to an implementation, the AI data may include DNN setting information. The AI setting information 238 may obtain the DNN setting information included in the AI data, and the AI upscaler 236 may perform AI upscaling on the second image 135 by using the DNN setting information.

According to an implementation, when pieces of information (e.g., the number of convolution layers, the number of filter kernels for each convolution layer, and parameters of each filter kernel) included in DNN setting information are stored as a lookup table, the AI setter 238 may obtain DNN setting information by combining some values selected from among values in the lookup table based on information included in the AI data, and the AI upscaler 236 may perform AI upscaling on the second image 135 by using the DNN setting information.

According to an implementation, when a DNN structure corresponding to an upscaling target is determined, the AI setter 238 may obtain DNN setting information, for example, parameters of a filter kernel, corresponding to the determined DNN structure.

As described above, the AI setter 238 obtains DNN setting information of the second DNN through the AI data including information related to the first DNN, and the AI upscaler 236 performs AI upscaling on the second image 135 through the second DNN set with the obtained DNN setting information, and in this case, the amount of memory usage and the number of computations may be reduced, compared to case where features of the second image 135 are directly analyzed for upscaling.

In an embodiment, when the second image 135 includes a plurality of frames, the AI setter 238 may independently obtain DNN setting information for each certain number of frames, or may obtain common DNN setting information for all of the frames.

Figure 6:
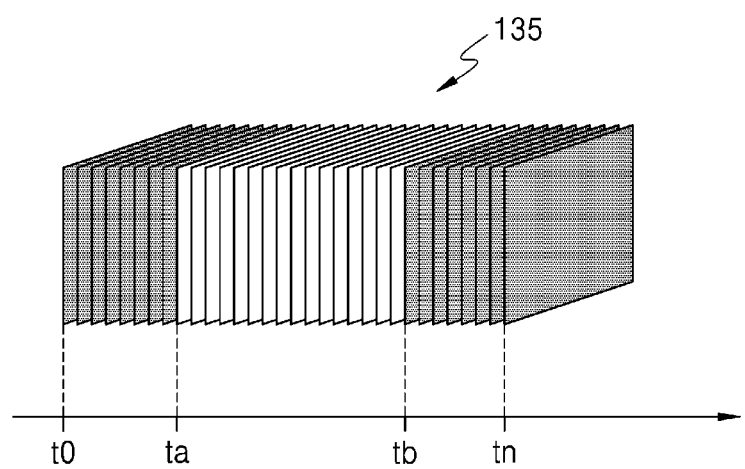
FIG. 6 is a diagram illustrating a second image including a plurality of frames.

FIG. 6 is a diagram illustrating the second image 135 including a plurality of frames.

As shown in FIG. 6, the second image 135 may include frames t0 to tn.

In an embodiment, the AI setter 238 may obtain DNN setting information of a second DNN through AI data, and the AI upscaler 236 may perform AI upscaling on the frames t0 to tn based on the DNN setting information. That is, AI upscaling may be performed on the frames t0 to tn based on common DNN setting information.

In another example, the AI setter 238 may obtain, from the AI data, DNN setting information 'A' for some of the frames t0 to tn, for example, frames t0 to ta, and may obtain DNN setting information 'B' for frames ta+1 to tb. Also, the AI setter 238 may obtain, from the AI data, DNN setting information 'C' a for frames tb+1 to tn. In other words, the AI setter 238 may independently obtain DNN setting information for each group including a certain number of frames from among a plurality of frames, and the AI upscaler 236 may perform AI upscaling on frames included in each group by using independently-obtained DNN setting information.

In another example, the AI setter 238 may independently obtain DNN setting information for each frame constituting the second image 135. For example, when the second image 135 includes three frames, the AI setter 238 may obtain DNN setting information in relation to a first frame, may obtain DNN setting information in relation to a second frame, and may obtain DNN setting information in relation to a third frame. That is, DNN setting information may be independently obtained for each of the first frame, the second frame, and the third frame. DNN setting information may be independently obtained for each frame constituting the second image 135, according to a method of obtaining the DNN setting information based on information provided from the first decoder 234 (prediction mode information, motion information, and quantization parameter information) and information related to the first image 115 included in the AI data. This is because the mode information and the quantization parameter information may be independently determined for each frame constituting the second image 135.

In another example, the AI data may include information indicating up to which frame DNN setting information obtained based on the AI data is valid. For example, when the AI data includes information indicating that DNN setting information is valid up to the frame ta, the AI setter 238 obtains DNN setting information based on the AI data, and the AI upscaler 236 performs AI upscaling on the frames t0 to ta by using the DNN setting information. When another AI data includes information indicating that DNN setting information is valid up to the frame tn, the AI setter 238 may obtain DNN setting information based on the other AI data, and the AI upscaler 236 may perform AI upscaling on the frames ta+1 to tn by using the obtained DNN setting information.

The AI encoding apparatus 700 for performing AI encoding on the original image 105 will be described with reference to FIG. 7.

Figure 7:
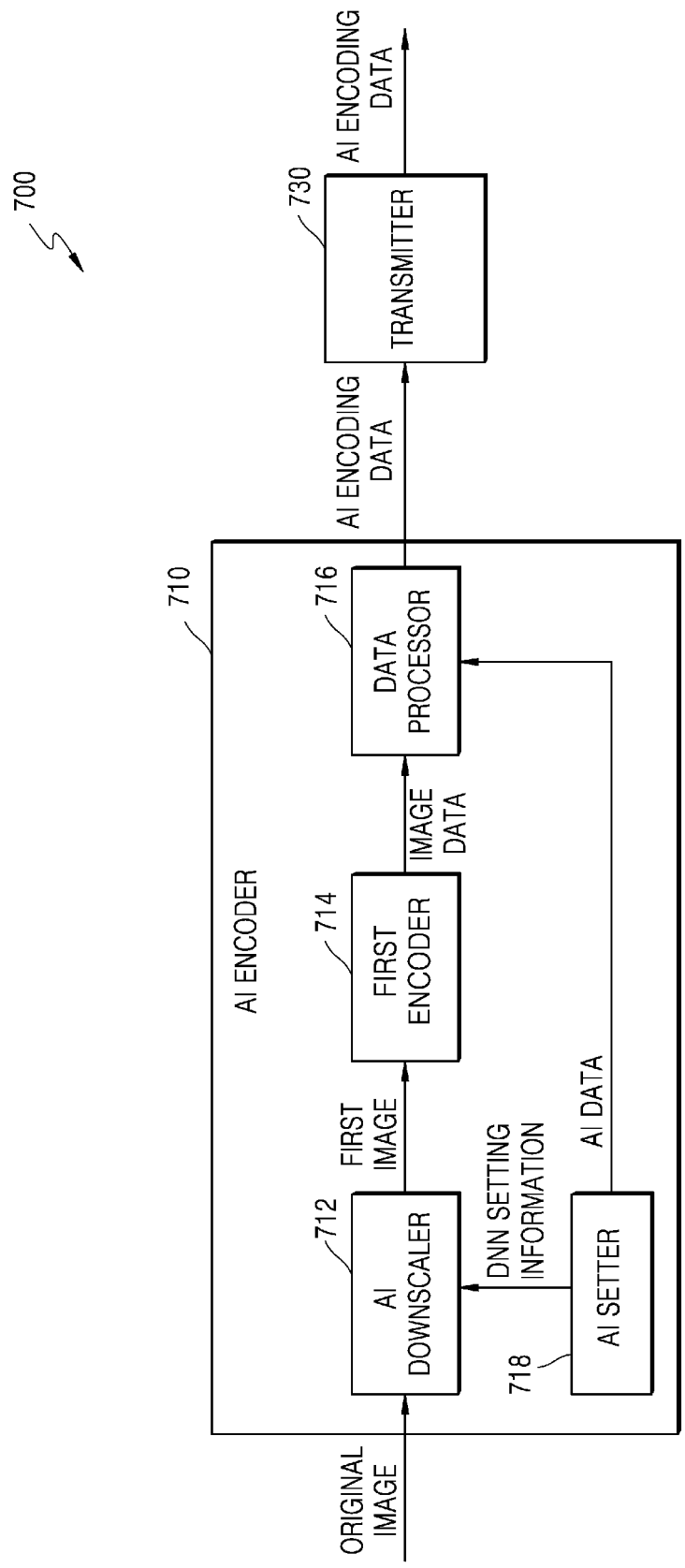
FIG. 7 is a block diagram illustrating a configuration of an AI encoding apparatus, according to an embodiment.

FIG. 7 is a block diagram illustrating a configuration of the AI encoding apparatus 700, according to an embodiment.

Referring to FIG. 7, the AI encoding apparatus 700 may include an AI encoder 710 and a transmitter 730. The AI encoder 710 may include an AI downscaler 712, a first encoder 714, a data processor 716, and an AI setter 718.

Although the AI encoder 710 and the transmitter 730 are individual devices in FIG. 7, the AI encoder 710 and the transmitter 730 may be implemented as one processor. In this case, the AI encoder 710 and the transmitter 730 may be implemented as a dedicated processor, or may be implemented through a combination of S/W and a general-purpose processor such as an AP, a CPU, or a GPU. Also, when the AI encoder 710 and the transmitter 730 are implemented as a dedicated processor, the dedicated processor may include a memory for implementing an embodiment of the present disclosure or a memory processor for using an external memory.

Also, the AI encoder 710 and the transmitter 730 may include a plurality of processors. In this case, the AI encoder 710 and the transmitter 730 may be implemented through a combination of dedicated processors, or a combination of S/W and multiple general-purpose processors such as an AP, a CPU, and a GPU. In an embodiment, the first encoder 714 may be implemented as a first processor, the AI downscaler 712, the data processor 716, and the AI setter 718 may be implemented as a second processor that is different from the first processor, and the transmitter 730 may be implemented as a third processor that is different from the first processor and the second processor.

The AI encoder 710 performs AI downscaling on the original image 105 and performs first encoding on the first image 115, and transmits AI encoding data to the transmitter 730. The transmitter 730 transmits the AI encoding data to the AI decoding apparatus 200.

Image data includes data obtained as a result of performing the first encoding on the first image 115. The image data may include data obtained based on pixel values in the first image 115, for example, residual data that is a difference between the first image 115 and prediction data with respect to the first image 115. Also, the image data includes pieces of information used during the first encoding of the first image 115. For example, the image data may include prediction mode information used to perform first encoding on the first image, motion information, and quantization parameter-related information used to the first encoding on the first image 115.

AI data includes pieces of information that enables the AI upscaler 236 to perform AI upscaling on the second image 135 to an upscaling target corresponding to a downscaling target of a first DNN.

In an embodiment, the AI data may include difference information between the original image 105 and the first image 115.

In an example, the AI data may include information related to the first image 115. The information related to the first image 115 may include information about at least one of a resolution of the first image 115, a bitrate of the image data obtained as a result of performing the first encoding on the first image 115, and a type of a codec used during the first encoding of the first image 115.

In an embodiment, the AI data may include an identifier of DNN setting information that is mutually agreed, so that AI upscaling is performed on the second image 135 to an upscaling target corresponding to a downscaling target of the first DNN.

Also, in an embodiment, the AI data may include DNN setting information settable in the second DNN.

The AI downscaler 712 may obtain the first image 115 by performing AI downscaling on the original image 105 through the first DNN. The AI downscaler 712 may perform the AI downscaling on the original image 105 by using DNN setting information provided form the AI setter 718.

The AI setter 718 may determine a downscaling target of the original image 105 based on a pre-determined criterion.

In order to obtain the first image 115 matching the downscaling target, the AI setter 718 may store a plurality of pieces of DNN setting information settable in the first DNN. The AI setter 718 obtains DNN setting information corresponding to the downscaling target from among the plurality of pieces of DNN setting information, and provides the obtained DNN setting information to the AI downscaler 712.

Each of the plurality of pieces of DNN setting information may be trained to obtain the first image 115 having a pre-determined resolution and/or a pre-determined image quality. For example, any one DNN setting information from among the plurality of pieces of DNN setting information may include pieces of information for obtaining the first image 115 having a resolution that is ½ times a resolution of the original image 105, for example, the first image 115 having a resolution of 2K (2048*1080) that is ½ times 4K (4096*2160) that is a resolution of the original image 105, and another DNN setting information may include pieces of information for obtaining the first image 115 having a resolution that is ¼ times a resolution of the original image 105, for example, the first image 115 having a resolution of 2K (2048*1080) that is ¼ times 8K (8192*4320) that is a resolution of the original image 105.

According to an implementation, when pieces of information (e.g., the number of convolution layers, the number of filter kernels for each convolution layer, and parameters of each filter kernel) included in DNN setting information are stored as a lookup table, the AI setter 718 may obtain DNN setting information by combining some values selected from among values in the lookup table according to a downscaling target and may provide the obtained DNN setting information to the AI downscaler 712.

According to an implementation, the AI setter 718 may determine a DNN structure corresponding to the downscaling target, and may obtain DNN setting information, for example, parameters of a filter kernel, corresponding to the determined DNN structure.

The plurality of pieces of DNN setting information for performing the AI downscaling on the original image 105 may have optimized values through joint training between the first DNN and the second DNN. Each DNN setting information includes at least one of the number of convolution layers included in the first DNN, the number of filter kernels for each convolution layer, and parameters of each filter kernel.

The AI downscaler 712 may set the first DNN with DNN setting information determined for performing the AI downscaling on the original image 105, and may obtain the first image 115 having a certain resolution and/or a certain image quality through the first DNN. When DNN setting information for performing the AI downscaling on the original image 105 is obtained from among the plurality of pieces of DNN setting information, each layer in the first DNN may process input data based on pieces of information included in the DNN setting information.

A method by which the AI setter 718 determines a downscaling target will be described. The downscaling target may indicate, for example, to what extent a resolution of the original image 105 should be reduced to obtain the first image 115.

The AI setter 718 obtains one or more pieces of input information. In an embodiment, the input information may include at least one of a target resolution of the first image 115, a target bitrate of image data, a type of a bitrate of the image data (e.g., a variable bitrate type, a constant bitrate type, or an average bitrate type), a color format to which AI downscaling is applied (a luminance component, a chrominance component, a red component, a green component, or a blue component), a codec type for performing first encoding on the first image 115, compression history information, a resolution of the original image 105, and a type of the original image 105.

The one or more pieces of input information may include information pre-stored in the AI encoding apparatus 700 or received from a user.

The AI setter 718 controls an operation of the AI downscaler 712 based on the input information. In an embodiment, the AI setter 718 may determine a downscaling target according to input information, and may provide DNN setting information corresponding to the determined downscaling target to the AI downscaler 712.

In an embodiment, the AI setter 718 may transmit at least part of the input information to the first encoder 714 so that the first encoder 714 performs the first encoding on the first image 115 based on a specific bitrate, a specific type of bitrate, and a specific codec.

In an embodiment, the AI setter 718 may determine a downscaling target based on at least one of a compression ratio (e.g., a resolution difference between the original image 105 and the first image 115 or a target bitrate), compression quality (e.g., a type of a bitrate), compression history information, and a type of the original image 105.

In an example, the AI setter 718 may determine a downscaling target based on a compression ratio or a compression quality which is pre-set or received from the user.

In another example, the AI setter 718 may determine a downscaling target by using compression history information stored in the AI encoding apparatus 700. For example, an encoding quality or a compression ratio preferred by the user may be determined according to compression history information that may be used by the AI encoding apparatus 700, and a downscaling target may be determined according to the encoding quality determined based on the compression history information. For example, a resolution and an image quality of the first image 115 may be determined according to an encoding quality that has been most frequently used according to the compression history information.

In another example, the AI setter 718 may determine a downscaling target based on an encoding quality that has been more frequently used than a certain threshold value (e.g., an average of encoding qualities that have been more frequently used than the certain threshold value) according to the compression history information.

In another example, the AI setter 718 may determine a downscaling target based on a resolution and a type (e.g., a file format) of the original image 105.

In an embodiment, when the original image 105 includes a plurality of frames, the AI setter 718 may independently obtain DNN setting information for each certain number of frames, and may provide the independently obtained DNN setting information to the AI downscaler 712.

In an example, the AI setter 718 may divide frames constituting the original image 105 into a certain number of groups, and may independently obtain DNN setting information for each group. The same DNN setting information or different pieces of DNN setting information may be obtained for each group. The same number of frames or different numbers of frames may be included in each group.

In another example, the AI setter 718 may independently determine DNN setting information for each frame constituting the original image 105. The same DNN setting information or different pieces of DNN setting information may be obtained for each frame.

A structure of a first DNN 800 based on which AI downscaling is performed will be described.

Figure 8:
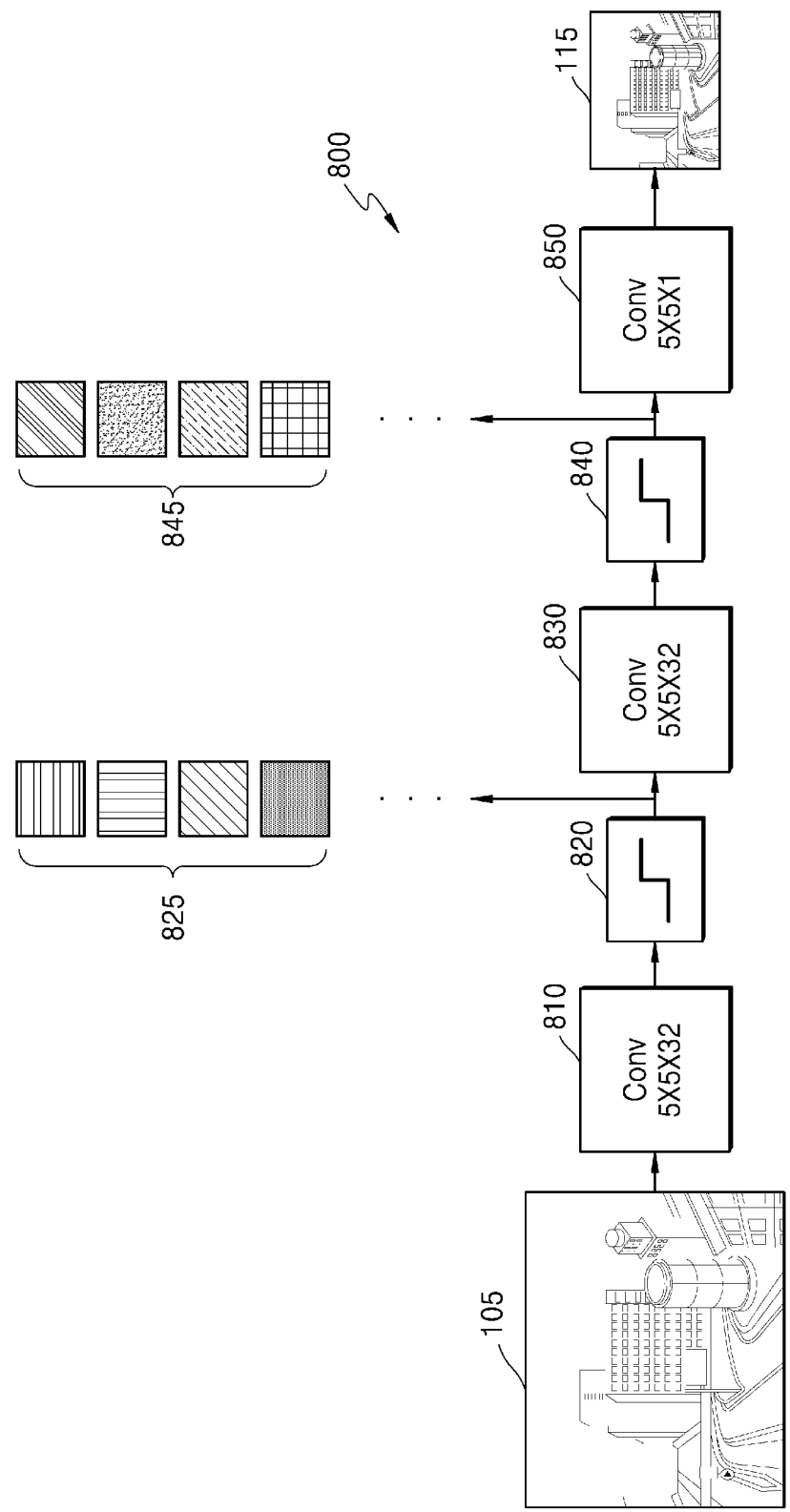
FIG. 8 is a diagram illustrating a first DNN for performing AI downscaling on an original image.

FIG. 8 is a diagram illustrating the first DNN 800 for performing AI downscaling on the original image 105.

As shown in FIG. 8, the original image 105 is input to a first convolution layer 810. The first convolution layer 810 performs a convolution operation on the original image 105 by using 32 filter kernels having a size of 5×5. 32 features maps generated as a result of the convolution operation are input to a first activation layer 820.

The first activation layer 820 may apply non-linear features to the 32 feature maps.

The first activation layer 820 determines whether to transmit, to a second convolution layer 830, sample values of feature maps output from the first convolution layer 810. For example, some of the sample values of the feature maps are activated by the first activation layer 820 and are transmitted to the second convolution layer 830, and other sample values are deactivated by the first activation layer 820 and are not transmitted to the second convolution layer 830. Information represented by the feature maps output from the first convolution layer 810 is emphasized by the first activation layer 820.

An output 825 of the first activation layer 820 is input to the second convolution layer 830. The second convolution layer 830 performs a convolution operation on input data by using 32 filter kernels having a size of 5×5. 32 feature maps output as a result of the convolution operation may be input to a second activation layer 840, and the second activation layer 840 may apply non-linear features to the 32 feature maps.

An output 845 of the second activation layer 840 is input to a third convolution layer 850. The third convolution layer 850 performs a convolution operation on data input by using one filter kernel having a size of 5×5. One image may be output as a result of the convolution operation from the third convolution layer 850. The third convolution layer 850 is a layer for outputting a final image and obtains one output by using the one filter kernel. According to an example of the present disclosure, the third convolution layer 850 may output the first image 115 as a result of a convolution operation.

There may be a plurality of pieces of DNN setting information each indicating the number of filter kernels of the filter kernels of the first convolution layer 810, the second convolution layer 830, and the third convolution layer 850, and parameters of each filter kernel, and the plurality of pieces DNN setting information should be jointly trained with a plurality of pieces of DNN setting information of a second DNN. A joint relationship between the plurality of pieces of DNN setting information of the first DNN and the plurality of pieces of DNN setting information of the second DNN may be implemented through joint training between the first DNN and the second DNN.

Although the first DNN 800 includes three convolution layers (the first to third convolution layers 810, 830, and 850) and two activation layer (the first and second activation layers 820 and 840) in FIG. 8, this is merely an example, and the number of convolution layers and the number of activation layers may vary according to an implementation. Also, according to an implementation, the first DNN 800 may be implemented through a recurrent neural network (RNN). This case means that a CNN structure of the first DNN 800 according to an example of the present disclosure is changed to an RNN structure.

In an embodiment, the AI downscaler 712 may include at least one ALU for a convolution operation and an arithmetic operation at each activation layer. The ALU may be implemented as a processor. For the convolution operation, the ALU may include a multiplier that performs multiplication between sample values of the original image 105 or a feature map output from a previous layer and sample values of a filter kernel, and an adder that adds results of the multiplication. Also, for the arithmetic operation at each activation layer, the ALU may include a multiplier that multiplies an input sample value by a pre-determined weight used in a sigmoid function, a Tan h function, or an ReLU function, and a comparator that compares a result of the multiplication with a certain value to determine whether to transmit the input sample value to a next layer.

Referring back to FIG. 7, the AI setter 718 transmits AI data to the data processor 716. The AI data includes pieces of information that enables the AI upscaler 236 to perform AI upscaling on the second image 135 to an upscaling target corresponding to a downscaling target of the first DNN.

The first encoder 714 receiving the first image 115 from the AI downscaler 712 may perform first encoding on the first image 115 according to an image compression method based on frequency transformation, thereby reducing the amount of information contained in the first image 115. Image data is obtained as a result of the first encoding via a certain code (e.g., MPEG-2, H.264, MPEG-4, HEVC, VC-1, VP8, VP9, or AV1). The image data is obtained according to rules, that is, syntax, of the certain codec. For example, the image data may include residual data that is a difference between the first image 115 and prediction data of the first image 115, prediction mode information used to perform the first encoding on the first image 115, motion information, and quantization parameter-related information used during the first encoding on the first image 115.

The image data obtained as a result of the first encoding by the first encoder 714 is provided to the data processor 716.

The data processor 716 generates AI encoding data including the image data received from the first encoder 714 and the AI data received from the AI setter 718.

In an embodiment, the data processor 716 may generate the AI encoding data including the image data and the AI data which are separated from each other. For example, the AI data may be included in a vendor specific infoframe (VSIF) in an HDMI stream.

In another embodiment, the data processor 716 may include AI data in image data obtained as a result of the first encoding by the first encoder 714, and may generate AI encoding data including the image data. For example, the data processor 716 may generate image data as one bitstream by combining a bitstream corresponding to image data with a bitstream corresponding to AI data. To this end, the data processor 716 may represent the AI data as bits having a value of 0 or 1, that is, a bitstream. In an embodiment, the data processor 716 may include a bitstream corresponding to AI data in supplemental enhancement information (SEI) that is an additional information area of a bitstream obtained as a result of the first encoding.

The AI encoding data is transmitted to the transmitter 730. The transmitter 730 transmits the AI encoding data obtained as a result of AI encoding through a network.

In an embodiment, the AI encoding data may be stored in any of data storage media including a magnetic medium such as a hard disk, a floppy disk, or a magnetic tape, an optical recording medium such as a CD-ROM or a DVD, and a magneto-optical medium such as a floptical disk.

Figure 9:
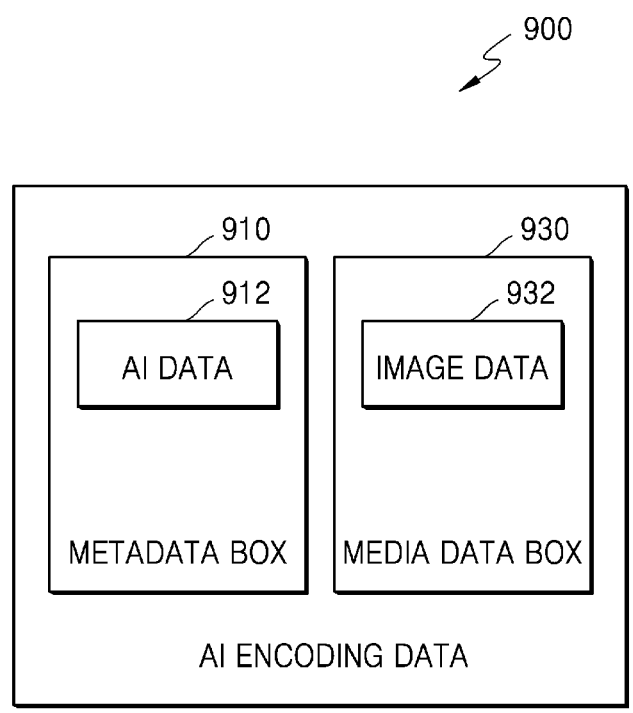
FIG. 9 is a diagram illustrating a structure of AI encoding data, according to an embodiment.

FIG. 9 is a diagram illustrating a structure of AI encoding data 900, according to an embodiment.

As described above, AI data 912 and image data 932 may be separately included in the AI encoding data 900. The AI encoding data 900 may be in a container format such as MP4, AVI, MKV, or FLV. The AI encoding data 900 may include a metadata box 910 and a media data box 930.

Information about the image data 932 included in the media data box 930 is included in the metadata box 910. For example, information about a type of the first image 115, a type of a codec used to encode the first image 115, and a playback time of the first image 115 may be included in the metadata box 910. Also, the AI data 912 may be included in the metadata box 910. The AI data 912 may be encoded according to an encoding method provided in a certain container format, and may be stored in the metadata box 910.

The media data box 930 may include the image data 932 generated according to syntax of a certain image compression method.

Figure 10:
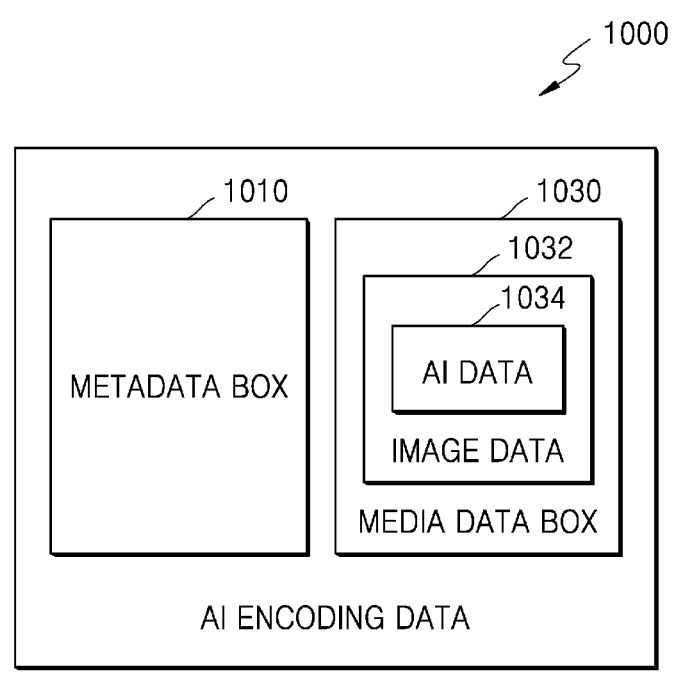
FIG. 10 is a diagram illustrating a structure of AI encoding data, according to another embodiment.

FIG. 10 is a diagram illustrating a structure of AI encoding data 1000, according to another embodiment.

Referring to FIG. 10, AI data 1034 may be included in image data 1032. The AI encoding data 1000 may include a metadata box 1010 and a media data box 1030. When the AI data 1034 is included in the image data 1032, the AI data 1034 may not be included in the metadata box 1010.

The image data 1032 including the AI data 1034 is included in the media data box 1030. For example, the AI data 1034 may be included in an additional information area of the image data 1032.

According to embodiments of the present disclosure, an image itself may inherently include information corresponding to the AI data 1034, or the AI data 1034 may be provided in addition to the image. For example, a decoding device may analyze an image received from an encoder device to obtain various information that is inherently included in the image, such as bitrate or resolution, and may use the information extracted from the image as the AI data.

A method of jointly training the first DNN 800 and the second DNN 300 will be described with reference to FIG. 11.

Figure 11:
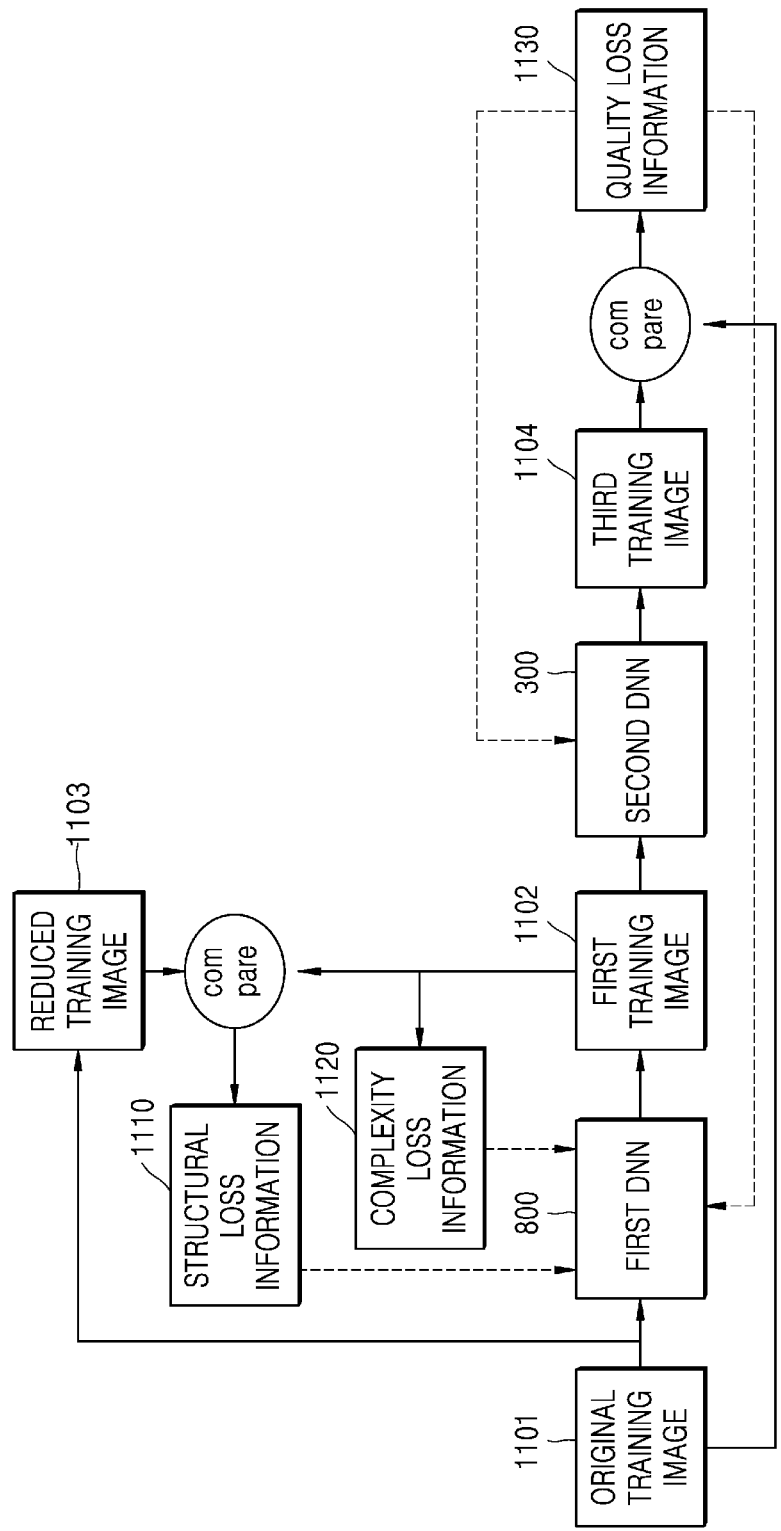
FIG. 11 is a diagram for describing a method of training a first DNN and a second DNN.

FIG. 11 is a diagram for describing a method of training the first DNN 800 and the second DNN 300.

In an embodiment, when the original image 105 that undergoes AI encoding through an AI encoding process is reconstructed into the third image 145 through an AI decoding process, and in order to maintain similarity between the original image 105 and the third image 145 obtained as a result of AI decoding, a joint relationship between the AI encoding process and the AI decoding process is required. That is, information lost in the AI encoding process should be restored in the AI decoding process. To this end, joint training of the first DNN 800 and the second DNN 300 is required.

For accurate AI decoding, it is necessary to ultimately reduce quality loss information 1130 corresponding to a result of comparison between a third training image 1104 and an original training image 1101 shown in FIG. 11. Accordingly, the quality loss information 1130 is used to train both the first DNN 800 and the second DNN 300.

First, a training process shown in FIG. 11 will be described.

In FIG. 11, the original training image 1101 is an image on which AI downscaling is to be performed, and a first training image 1102 is an image obtained by performing AI downscaling on the original training image 1101. Also, the third training image 1104 is an image obtained by performing AI upscaling on the first training image 1102.

The original training image 1101 includes a still image or a moving image including a plurality of frames. In an embodiment, the original training image 1101 may include a luminance image extracted from the still image or the moving image including the plurality of frames. Also, in an embodiment, the original training image 1101 may include a patch image extracted from the still image or the moving image including the plurality of frames. When the original training image 1101 includes a plurality of frames, each of the first training image 1102, a second training image, and the third training image 1104 also includes a plurality of frames. When the plurality of frames of the original training image 1101 are sequentially input to the first DNN 800, the plurality of frames of each of the first training image 1102, the second training image, and the third training image 1104 may be sequentially obtained through the first DNN 800 and the second DNN 300.

For joint training of the first DNN 800 and the second DNN 300, the original training image 1101 is input to the first DNN 800. The first training image 1102 is output by performing AI downscaling on the original training image 1101 input to the first DNN 800 and is input to the second DNN 300. The third training image 1104 is output as a result of performing AI upscaling on the first training image 1102.

Referring to FIG. 11, the first training image 1102 is input to the second DNN 300. According to an implementation, the second training image obtained by performing first encoding and first decoding on the first training image 1102 may be input to the second DNN 300. In order to input the second training image to the second DNN, any one codec from among MPEG-2, H.264, MPEG-4, HEVC, VC-1, VP8, VP9, and AV1 may be used. In detail, any one codec from among MPEG-2, H.264, MPEG-4, HEVC, VC-1, VP8, VP9, and AV1 may be used to perform first encoding on the first training image 1102 and first decoding on image data corresponding to the first training image 1102.

Referring to FIG. 11, apart from the first training image 1102 being output through the first DNN 800, a reduced training image 1103 is obtained by legacy downscaling on the original training image 1101. The legacy downscaling may include at least one of bilinear scaling, bicubic scaling, Lanczos scaling, and stairstep scaling.

In order to prevent structural features of the first image 115 from greatly deviating from structural features of the original image 105, the reduced training image 1103 that preserves structural features of the original training image 1101 is obtained.

Before training is performed, the first DNN 800 and the second DNN 300 may be set with pre-determined DNN setting information. As the training is performed, structural loss information 1110, complexity loss information 1120, and quality loss information 1130 may be determined.

The structural loss information 1110 may be determined based on a result of comparison between the reduced training image 1103 and the first training image 1102. In an example, the structural loss information 1110 may correspond to a difference between structural information of the reduced training image 1103 and structural information of the first training image 1102. Structural information may include various features extractable from an image such as a luminance, a contrast, and a histogram of the image. The structural loss information 1110 indicates to what extent structural information of the original training image 1101 is preserved in the first training image 1102. As the structural loss information 1110 decreases, similarity between structural information of the first training image 1102 and structural information of the original training image 1101 increases.

The complexity loss information 1120 may be determined based on spatial complexity of the first training image 1102. In an example, a total variance value of the first training image 1102 may be used as spatial complexity. The complexity loss information 1120 is related to a bitrate of image data obtained by performing first encoding on the first training image 1102. As the complexity loss information 1120 decreases, it means that a bitrate of image data decreases.

The quality loss information 1130 may be determined based on a result of comparison between the original training image 1101 and the third training image 1104. The quality loss information 1130 may include at least one of an L1-norm value, a L2-norm value, a structural similarity index metric (SSIM) value, a peak signal-to-noise ratio-human vision system (PSNR-HVS) value, a multiscale SSIM (MS-SSIM) value, a variance inflation factor (VIF) value, and a video multimethod assessment fusion (VMAF) value, indicating a difference between the original training image 1101 and the third training image 1104. The quality loss information 1130 indicates how similar the third training image 1104 is to the original training image 1101. As the quality loss information 1130 decreases, similarity between the third training image 1104 and the original training image 1101 increases.

Referring to FIG. 11, the structural loss information 1110, the complexity loss information 1120, and the quality loss information 1130 are used to train the first DNN 800, and the quality loss information 1130 is used to train the second DNN 300. That is, the quality loss information 1130 is used to train both the first DNN 800 and the second DNN 300.

The first DNN 800 may update parameters to reduce or minimize final loss information determined based on the structural loss information 1110, the complexity loss information 1120, and the quality loss information 1130. Also, the second DNN 300 may update a parameter to reduce or minimize the quality loss information 1130.

Final loss information for training the first DNN 800 and the second DNN 300 may be determined as in Equation 1.

$$\text{LossDS} = a \times \text{structural loss information} + b \times \text{complexity loss information} + c \times \text{quality loss information}$$

$$\text{LossUS} = d \times \text{quality loss information} \qquad \text{[Equation 1]}$$

In Equation 1, LossDS denotes final loss information that needs to be reduced or minimized to train the first DNN 800, and LossUS denotes final loss information that needs to be reduced or minimized to train the second DNN 300. Also, a, b, c, and d may correspond to pre-determined weights.

That is, the first DNN 800 updates parameters so that LossDS of Equation 1 decreases, and the second DNN 300 updates parameters so that LossUS decreases. When the parameters of the first DNN 800 are updated according to LossDS derived during the training, the first training image 1102 obtained based on the updated parameters becomes different from the first training image 1102 obtained during previous training, and thus, the third training image 1104 also becomes different from the third training image 1104 obtained during the previous training. When the third training image 1104 becomes different from the third training image 1104 during the previous training, the quality loss information 1130 is also newly determined, and thus, the second DNN 300 updates the parameters according to the newly determined quality loss information. When the quality loss information 1130 is newly determined, LossDS is also newly determined, and thus, the first DNN 800 updates the parameters according to the newly determined LossDS. That is, updating of the parameters of the first DNN 800 causes updating of the parameters of the second DNN 300, and updating of the parameters of the second DNN 300 causes updating of the parameters of the first DNN 800. In other words, because the first DNN 800 and the second DNN 300 are jointly trained by sharing the quality loss information 1130, the parameters of the first DNN 800 and the parameters of the second DNN 300 may be jointly optimized.

Referring to Equation 1, although LossUS is determined according to the quality loss information 1130, this is merely an example, and LossUS may be determined based on at least one of the structural loss information 1110 and the complexity loss information 1120, and the quality loss information 1130.

While it has been described that the AI setter 238 of the AI decoding apparatus 200 and the AI setter 718 of the AI encoding apparatus 700 each store a plurality of pieces of DNN setting information, a method of training a plurality of pieces of DNN setting information stored in each the AI setter 238 and the AI setter 718 will be described.

As described with reference to Equation 1, the first DNN 800 updates the parameters by considering a degree of similarity (the structural loss information 1110) between the structural information of the first training image 1102 and the structural information of the original training image 1101, a bitrate (the complexity loss information 1120) of the image data obtained as a result of performing the first encoding on the first training image 1102, and a difference (the quality loss information 1130) between the third training image 1104 and the original training image 1101.

In detail, the parameters of the first DNN 800 may be updated so that the first DNN 800 obtains the first training image 1102 having similar structural information to structural information of the original training image 1101 and having a low bitrate of image data obtained by performing first encoding, and at the same time, the second DNN 300 obtains the third training image 1104 similar to the original training image 1101 as a result of performing AI upscaling on the first training image 1102.

A direction in which the parameters of the first DNN 800 are optimized may vary by adjusting the weights a, b, and c shown in Equation 1. For example, when the weight b is determined to be high, the parameters of the first DNN 800 may be updated by prioritizing a low bitrate over a high quality of the third training image 1104. Also, when the weight c is determined to be high, the parameters of the first DNN 800 may be updated by prioritizing a high quality of the third training image 1104 over a high bitrate or maintaining the structural information of the original training image 1101.

Also, a direction in which the parameters of the first DNN 800 are optimized may vary according to a type of a codec used to perform the first encoding on the first training image 1102. This is because the second training image to be input to the second DNN 300 varies according to a type of a codec.

That is, the parameters of the first DNN 800 and the parameters of the second DNN 300 may be jointly updated based on the weight a, the weight b, the weight c, and the type of the codec for performing the first encoding on the first training image 1102. Accordingly, when the first DNN 800 and the second DNN 300 are trained after the weight a, the weight b, and the weight c are determined as certain values and the type of the codec is determined as a certain type, the parameters of the first DNN 800 and the parameters of the second DNN 300 which are jointly optimized may be determined.

When the first DNN 800 and the second DNN 300 are trained after the weight a, the weight b, the weight c, and the type of the codec are changed, the parameters of the first DNN 800 and the parameters of the second DNN 300 which are jointly optimized may be determined. In other words, when the first DNN 800 and the second DNN 300 are trained while changing values of the weight a, the weight b, the weight c, and the type of the codec, a plurality of pieces of DNN setting information that are jointly trained may be determined by the first DNN 800 and the second DNN 300.

As described above with reference to FIG. 5, a plurality of pieces of DNN setting information of the first DNN 800 and the second DNN 300 may be mapped to pieces of first image-related information. To set such a mapping relationship, first encoding may be performed on the first training image 1102 output from the first DNN 800 via a specific codec according to a specific bitrate, and the second training image obtained by performing first decoding on a bitstream obtained as a result of the first encoding may be input to the second DNN 300. That is, by training the first DNN 800 and the second DNN 300 after setting an environment so that the first encoding is performed on the first training image 1102 having a specific resolution via a specific codec according to a specific bitrate, a pair of pieces of DNN setting information mapped to the resolution of the first training image 1102, a type of the codec used to perform the first encoding on the first training image 1102, and the bitrate of the bitstream obtained as a result of performing the first encoding on the first training image 1102 may be determined. By variously changing a resolution of the first training image 1102, a type of a codec used to perform the first encoding on the first training image 1102, and a bitrate of a bitstream obtained as a result of the first encoding of the first training image 1102, a mapping relationship between a plurality of pieces of DNN setting information of the first DNN 800 and the second DNN 300 and pieces of first image-related information may be determined.

Figure 12:
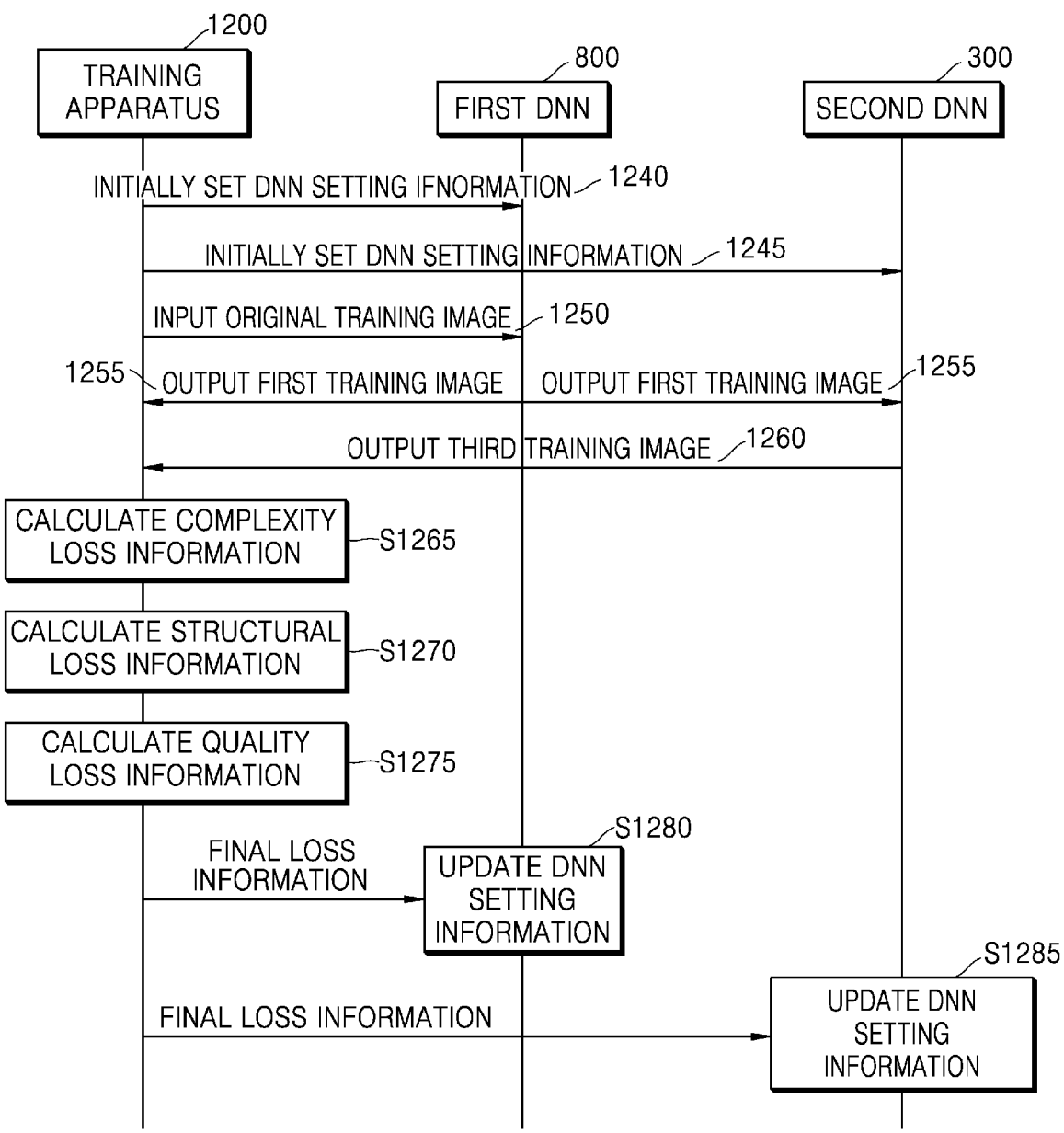
FIG. 12 is a diagram for describing a process by which a training apparatus trains a first DNN and a second DNN.

FIG. 12 is a diagram for describing a process by which a training apparatus 1200 trains the first DNN 800 and the second DNN 300.

The training of the first DNN 800 and the second DNN 300 described in relation to FIG. 11 may be performed by the training apparatus 1200. The training apparatus 1200 includes the first DNN 800 and the second DNN 300. The training apparatus 1200 may be, for example, the AI encoding apparatus 700 or a separate server. Pieces of DNN setting information of the second DNN 300 obtained as a result of training are stored in the AI decoding apparatus 200.

Referring to FIG. 12, the training apparatus 1200 initially sets DNN setting information of the first DNN 800 and DNN setting information of the second DNN 300 (S1240 and S1245). Accordingly, the first DNN 800 and the second DNN 300 may operate according to pre-determined DNN setting information. The DNN setting information may include information about at least one of the number of convolution layers included in each of the first DNN 800 and the second DNN 300, the number of filter kernels for each convolution layer, a size of filter kernels for each convolution layer, and parameters of each filter kernel.

The training apparatus 1200 inputs the original training image 1101 to the first DNN 800 (S1250). The original training image 1101 may include a still image or at least one frame constituting a moving image.

The first DNN 800 processes the original training image 1101 according to the initially set DNN setting information, and outputs the first training image 1102 obtained by performing AI downscaling on the original training image 1101 (S1255). Although the first training image 1102 output from the first DNN 800 is directly input to the second DNN 300 in FIG. 12, the first training image 1102 output from the first DNN 800 may be input to the second DNN 300 by the training apparatus 1200. Also, the training apparatus 1200 may perform first encoding and first decoding on the first training image 1102 via a certain codec, and then may input a second training image to the second DNN 300.

The second DNN 300 processes the first training image 1102 or the second training image according to the initially set DNN setting information, and outputs the third training image 1104 obtained by performing AI upscaling on the first training image 1102 or the second training image (S1260).

The training apparatus 1200 calculates the complexity loss information 1120 based on the first training image 1102 (S1265).

The training apparatus 1200 calculates the structural loss information 1110 by comparing the reduced training image 1103 with the first training image 1102 (S1270).

The training apparatus 1200 calculates the quality loss information 1130 by comparing the original training image 1101 with the third training image 1104 (S1275).

The first DNN 800 updates the initially set DNN setting information through a back propagation process based on final loss information (S1280). The training apparatus 1200 may calculate the final loss information for training the first DNN 800 based on the complexity loss information 1120, the structural loss information 1110, and the quality loss information 1130.

The second DNN 300 updates the initially set DNN setting information through a back propagation process based on the quality loss information or final loss information (S1285). The training apparatus 1200 may calculate the final loss information for training the second DNN 300 based on the quality loss information 1130.

Next, the training apparatus 1200, the first DNN 800, and the second DNN 300 repeatedly perform operations S1250 to S1285 until pieces of final loss information are minimized to update the DNN setting information. In this case, during each repeated process, the first DNN 800 and the second DNN 300 operate according to pieces of DNN setting information updated in the previous process.

Table 1 shows effects of AI encoding and AI decoding that are performed on the original image 105 according to an embodiment of the present disclosure, as well as effects of encoding and decoding that are performed on the original image 105 via a HEVC codec.

TABLE 1

| Content | Resolution | Number of Frames | Information Amount (Bitrate) (Mbps) | | Subjective Image quality Score (VMAF) | |
|---|---|---|---|---|---|---|
| | | | HEVC | AI Encoding/ AI Decoding | HEVC | AI Encoding/ AI Decoding |
| Content 1 | 8K | 300 | 46.3 | 21.4 | 94.80 | 93.54 |
| Content 2 | (7680 × 4320) | frames | 46.3 | 21.6 | 98.05 | 98.98 |
| Content 3 | | | 46.3 | 22.7 | 96.08 | 96.00 |
| Content 4 | | | 46.1 | 22.1 | 86.26 | 92.00 |
| Content 5 | | | 45.4 | 22.7 | 93.42 | 92.98 |
| Content 6 | | | 46.3 | 23.0 | 95.99 | 95.61 |
| | Average | | 46.11 | 22.25 | 94.10 | 94.85 |

As shown in Table 1, when AI encoding and AI decoding are performed on content including 300 frames with an 8K resolution according to an embodiment of the present disclosure, a subjective image quality is higher than that achieved through HEVC codec encoding and decoding. However, a bitrate obtained according to the embodiment of the present disclosure is reduced by more than 50% compared to when using the HEVC codec.

A region where users concentrate their attention may vary according to a type of an image. For example, users tend to focus on faces in video call images. In this case, adaptively adjusting the quality of encoding/decoding for each region constituting a video call image rather than encoding/decoding the entire region of the video call image with the same quality, may result in a lower bitrate while still providing the user with visual satisfaction. In other words, even when a face region is encoded/decoded in high quality and a region other than a face is encoded/decoded in low quality in a video call image, the user may perceive the overall image quality of the video call image as excellent.

A method of performing AI encoding and AI decoding differently in a region of interest and a non-interest region in an image will be described with reference to FIGS. 13 to 24.

Figure 13:
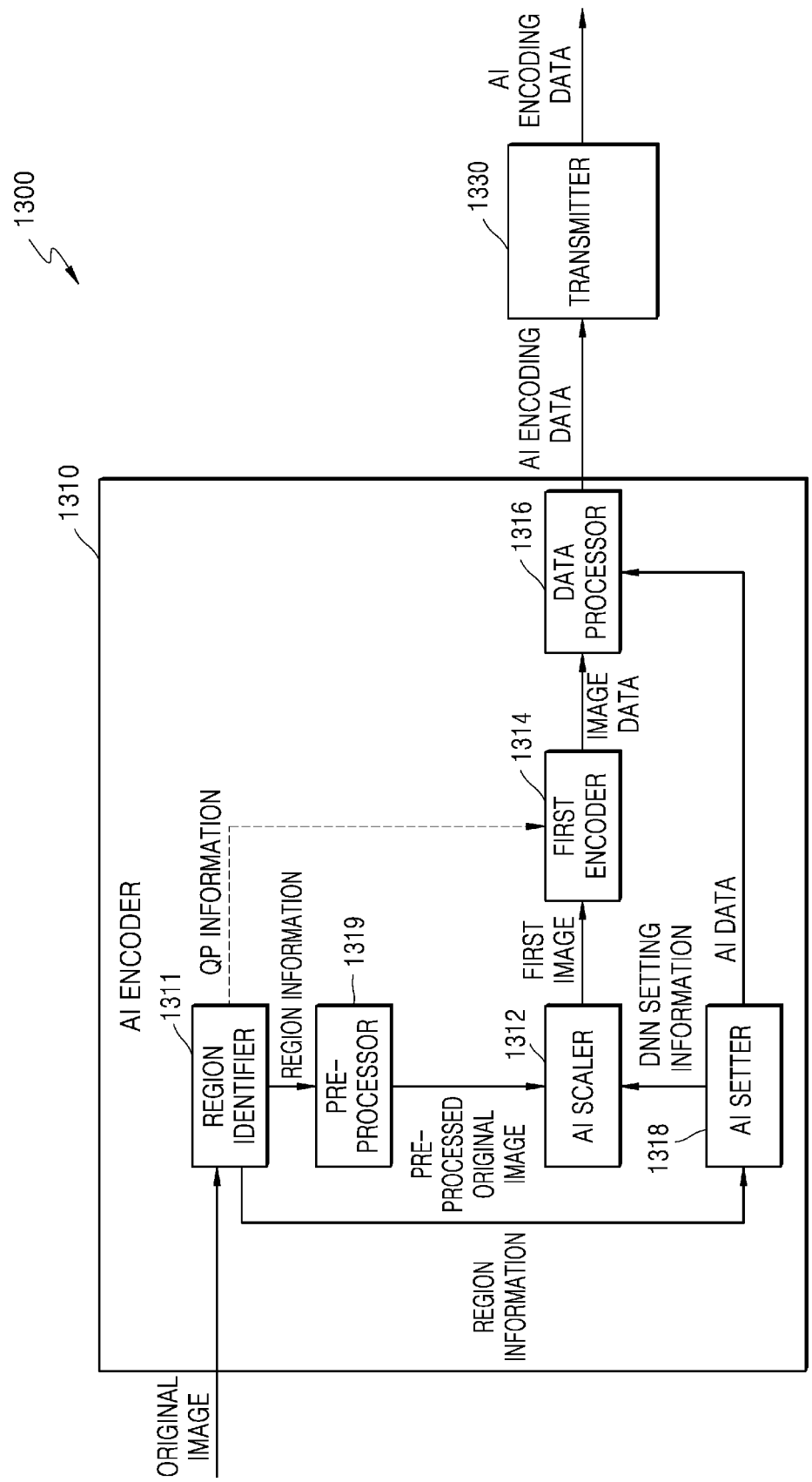
FIG. 13 is a block diagram illustrating a configuration of an AI encoding apparatus, according to another embodiment.

FIG. 13 is a block diagram illustrating a configuration of an AI encoding apparatus 1300, according to another embodiment.

Referring to FIG. 13, the AI encoding apparatus 1300 may include an AI encoder 1310 and a transmitter 1330. The AI encoder 1310 may include a region identifier 1311, a pre-processor 1319, an AI scaler 1312, a first encoder 1314, a data processor 1316, and an AI setter 1318.

Although the AI encoder 1310 and the transmitter 1330 are illustrated as separate devices in FIG. 13, the AI encoder 1310 and the transmitter 1330 may be implemented as a single processor. In this case, the AI encoder 1310 and the transmitter 1330 may be implemented as a dedicated processor, or may be implemented through a combination of software and a general-purpose processor such as an AP, a CPU, or a GPU. Also, when the AI encoder 1310 and the transmitter 1330 are implemented as a dedicated processor, the dedicated processor may include a memory for implementing an embodiment of the present disclosure or a memory processor for using an external memory.

Also, the AI encoder 1310 and the transmitter 1330 may include a plurality of processors. In this case, the AI encoder 1310 and the transmitter 1330 may be implemented through a combination of dedicated processors, or may be implemented through a combination of S/W and multiple general-purpose processors such as an AP, a CPU, and a GPU.

The AI encoder 1310 performs AI scaling on an original image and first encoding on a first image, and transmits AI encoding data to the transmitter 1330. The transmitter 1330 transmits the AI encoding data to an AI decoding apparatus 2000.

When compared to the AI encoder 710 of FIG. 7, the AI encoder 1310 may further include the region identifier 1311 and the pre-processor 1319. Also, the AI encoder 710 of FIG. 7 includes the AI downscaler 712, whereas the AI encoder 1310 of FIG. 13 includes the AI scaler 1312. This is because the AI encoder 1310 may perform AI upscaling as well as AI downscaling according to an embodiment.

The region identifier 1311 identifies specific regions in the original image. When the region identifier 1311 identifies certain regions in the original image, it may mean that the region identifier 1311 divides the original image into a plurality of distinct regions.

The region identifier 1311 may identify a location of each region in the original image.

The regions identified within the original image may include an object region of interest and a non-interest region. The region identifier 1311 may identify a region including an object of interest in the original image as an object region of interest, and may identify a region other than the object region of interest as a non-interest region.

Types of object regions of interest may be pre-determined and pre-stored. In an example, a face object or a text object included in the original image may be predetermined as the object of interest, and may be stored in a local storage or an external storage.

In an embodiment, there may be multiple types of objects of interest that need to be identified within the original image. For example, when a face object and a text object are pre-determined as objects of interest, the region identifier 1311 may identify a face object region and a text object region as objects of interest within the original image. The region identifier 1311 may consider any remaining region that is not identified as an object of interest as a non-interest region within the original image.

In an embodiment, the region identifier 1311 may use at least one DNN to identify an object region of interest from the original image. For example, the region identifier 1311 may use a face detection DNN configured to identify facial features such as eyes, nose, and mouth in an image, and may use these features to identify the location of a face. Also, the region identifier 1311 may use a text detection DNN configured to identify features such as lines or curves that are associated with text, and may use these features to locate text within an image. Once the face detection DNN and/or the text detection DNN identify the location of the object of interest (i.e., face and/or text), the region identifier 1311 may create a bounding box around the object region of interest in the image. This bounding box may be used to isolate the object region of interest and apply further processing, such as higher quality encoding/decoding.

In another embodiment, the region identifier 1311 may identify an object region of interest in the original image through an algorithm such as support vector machine (SVM) or principal component analysis (PCA).

The region identifier 1311 transmits region information corresponding to a result of identifying the regions to the pre-processor 1319. The region information may include types and locations of the regions (i.e., the object region of interest and the non-interest region) identified in the original image.

In an embodiment, the region information may include a region map, and the region map will be described with reference to FIG. 14.

Figure 14:
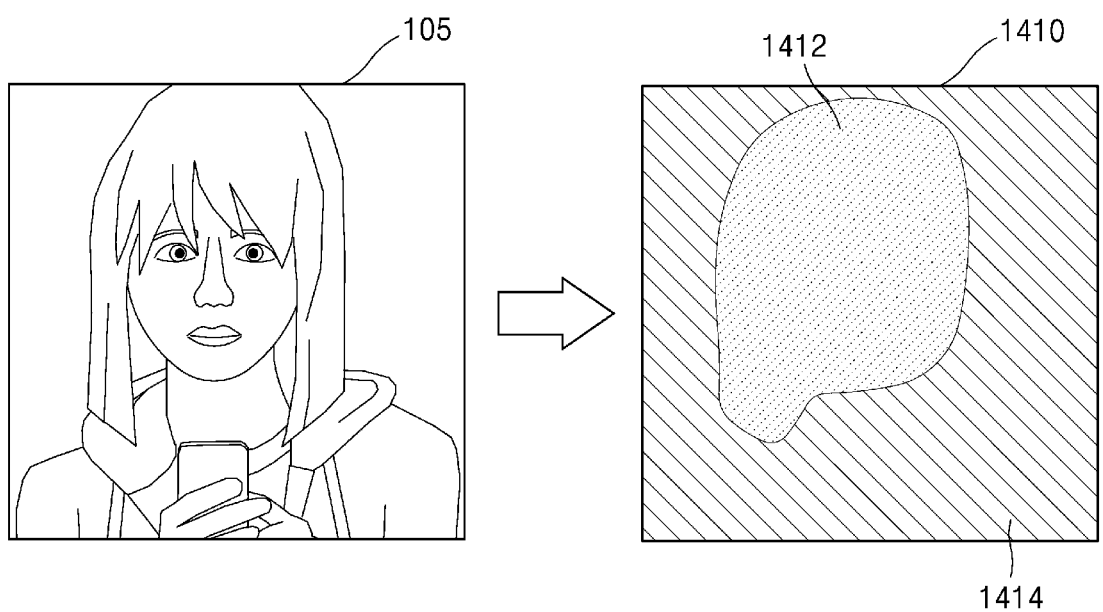
FIG. 14 is a view illustrating a region map obtained from an original image.

FIG. 14 is a view illustrating a region map 1410 obtained from the original image 105.

When an object of interest is a face object, the region identifier 1311 may identify a face object region and a non-interest region in the original image 105.

As shown in FIG. 14, the region map 1410 may include samples having a pre-determined first sample value in a face object region 1412 and samples having a pre-determined second sample value in a non-interest region 1414. The first sample value and the second sample value may be different from each other. When two types of objects are identified as objects of interest in the original image 105, the region map 1410 may include samples having a pre-determined first sample value in any one object region of interest, samples having a pre-determined second sample value in the other object region of interest, and samples having a pre-determined third sample value in a non-interest region.

As described below, the region identifier 1311 may determine a quantization parameter corresponding to each region identified in the original image from region information. The region identifier 1311 may transmit the quantization parameter, along with pixel locations of each region, to the first encoder 1314.

The pre-processor 1319 pre-processes the original image based on the region information received from the region identifier 1311. The pre-processing of the original image may include at least one of cropping and filtering of the original image. First, cropping will be described in detail. Cropping refers to an operation of removing an unnecessary portion from an image.

In an embodiment, the pre-processor 1319 may obtain a plurality of original part images respectively including regions identified from the original image. The plurality of original part images may individually include regions identified from the original image. Sizes of the original image and the original part images may be the same.

The pre-processor 1319 may obtain original part images respectively including regions through cropping of the regions identified in the original image based on the region information. In this case, when two or more object regions of interest of the same type are included in the original image, the two or more object regions of interest of the same type may be included in one original part image. For example, when two faces are included in the original image and a face object corresponds to an object of interest, two face object regions may be included in one original part image.

When a first object region of interest, a second object region of interest, and a non-interest region are identified in the original image, the pre-processor 1319 may obtain a first original part image by cropping the first object region of interest based on a location (e.g., pixel locations) of the first object region of interest, and may obtain a second original part image by cropping the second object region of interest based on a location (e.g., pixel locations) of the second object region of interest. Also, the pre-processor 1319 may obtain a third original part image by cropping the non-interest region based on a location (e.g., pixel locations) of the non-interest region.

Figure 15:
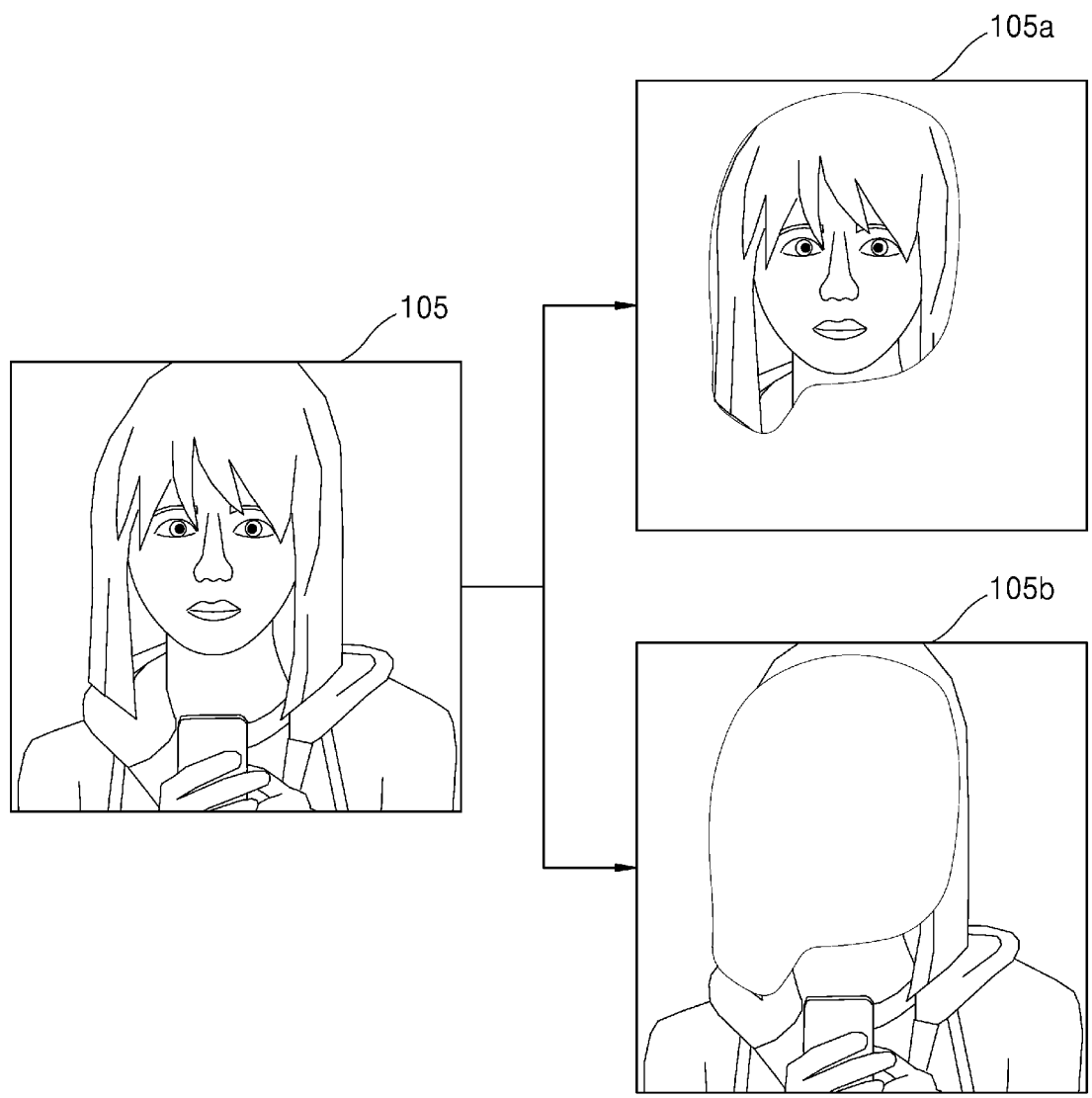
FIG. 15 is a view illustrating a plurality of original part images generated from an original image.

FIG. 15 is a view illustrating a plurality of original part images (e.g., 105*a* and 105*b*) generated from the original image 105.

When a face object region corresponding to an object region of interest and a non-interest region are identified from the original image 105, the pre-processor 1319 may obtain a first original part image 105*a* including the face object region in the original image 105, and a second original part image 105*b* including the non-interest region in the original image 105.

The first original part image 105*a* may include pixels having the same pixel values as pixel values of pixels constituting the face object region in the original image 105, and pixels having a pre-determined pixel value (e.g., 0). A location of the face object region in the original image 105 and a location of the face object region in the first original part image 105*a* may be the same.

The second original part image 105*b* may include pixels having the same pixel values as pixel values of pixels constituting the non-interest region in the original image 105, and pixels having a pre-determined pixel value (e.g., 0). A location of the non-interest region in the original image 105 and a location of the non-interest region in the second original part image 105*b* may be the same.

Figure 16:
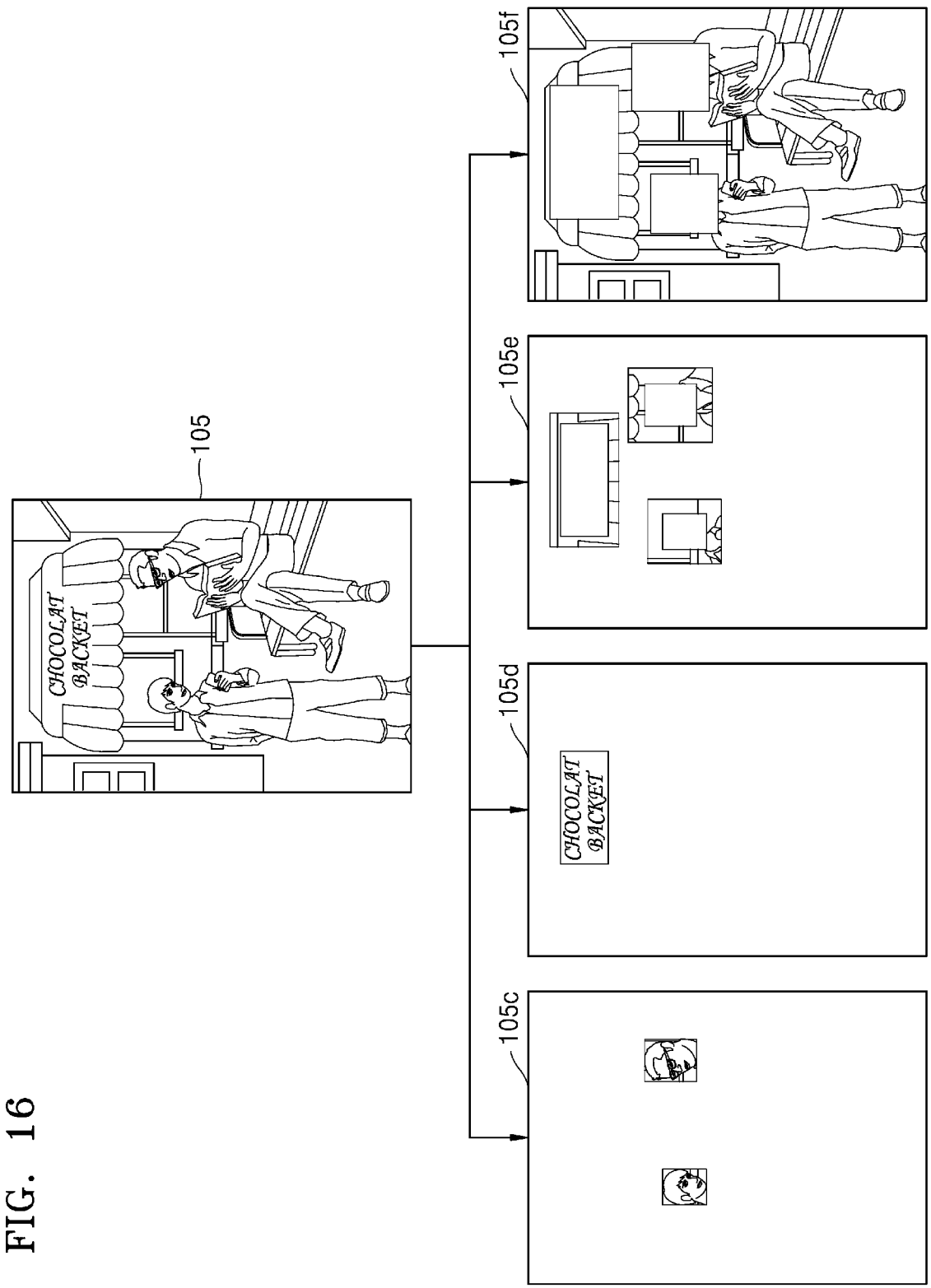
FIG. 16 is a view illustrating a plurality of original part images generated from an original image.

FIG. 16 is a view illustrating a plurality of original part images (e.g., 105*c*, 105*d*, 105*e*, and 105*f*) generated from the original image 105.

Regions identified by the region identifier 1311 in the original image 105 may further include a boundary region in addition to an object region of interest and a non-interest region. The boundary region may correspond to a region between the object region of interest and the non-interest region in the original image 105. The reason for identifying the boundary region is to remove artifacts that may occur when processing individual original part images that include an object region of interest and an original part image. For example, when a reconstructed image is obtained by encoding/decoding the original part image including an object region of interest in high quality and encoding/decoding the original part image including a non-interest region in low quality, boundary artifacts may occur between the object region of interest and the non-interest region in the reconstructed image. Accordingly, the region identifier 1311 may remove such boundary artifacts by encoding/decoding the boundary region between the object region of interest and the non-interest region in medium quality.

When the object region of interest is identified in the original image 105, the region identifier 1311 may identify a portion having a predetermined size around the object region of interest as the boundary region, and may identify a portion other than the object region of interest and the boundary region as the non-interest region.

Referring to FIG. 16, a face object region, a text object region, a boundary region, and a non-interest region may be identified in the original image 105. The face object region and the text object region may correspond to object regions of interest.

The pre-processor 1319 may obtain a first original part image 105*c* including the face object region, a second original part image 105*d* including the text object region, a third original part image 105*e* including the boundary region, and a fourth original part image 105*f* including the non-interest region.

When the pre-processor 1319 crops the original image based on region information, a pre-processed original image provided from the pre-processor 1319 to the AI scaler 1312 in FIG. 13 may be a plurality of original part images.

The AI scaler 1312 obtains a plurality of first images by performing AI scaling on the plurality of original part images through a first DNN. The first DNN operates according to DNN setting information provided from the AI setter 1318. A structure of the first DNN may be the same as that of FIG. 8, and thus, a detailed description thereof will be omitted.

The AI setter 1318 may obtain DNN setting information to be used for AI scaling of the plurality of original part images according to a type of a region included in each of the plurality of original part images. The AI setter 1318 may obtain different pieces of DNN setting information for the plurality of original part images according to types of regions included in the plurality of original part images.

FIG. 17 is a diagram illustrating a mapping relationship between types of regions included in an original part image and a plurality of pieces of DNN setting information. The plurality of pieces of DNN setting information may refer to a plurality of neural network parameter sets, wherein each of the plurality of neural network parameter sets may include weights and biases. The plurality of pieces of DNN setting information may be pre-stored in an encoding device and a decoding device, but the embodiments of the present disclosure are not limited thereto, and the plurality of pieces of DNN setting information may be acquired from an external device.

The AI setter 1318 may pre-store a plurality of pieces of DNN setting information to be set in a first DNN. The plurality of pieces of DNN setting information may have optimized values when the first DNN and a second DNN of the AI decoding apparatus 2000 are jointly trained.

Each DNN setting information includes at least one of the number of convolution layers included in the first DNN, the number of filter kernels for each convolution layer, and parameters of each filter kernel.

A magnification at which a size of an original part image is changed through AI scaling by the first DNN may vary according to DNN setting information. For example, any one DNN setting information may be used to obtain a first image having a size that is ½ times a size of an original part image, and another DNN setting information may be used to obtain a first image having a size that is ⅓ times a size of an original part image.

In an embodiment, some of a plurality of pieces of DNN setting information stored in the AI setter 1318 may be used to obtain a first image having a size greater than a size of an original part image. That is, all of pieces of DNN setting information described with reference to FIG. 7 are used to reduce a size of an original image, but some of pieces of DNN setting information that may be used by the AI encoding apparatus 1300 of FIG. 13 may be used to increase a size of an original part image. Accordingly, the first DNN used by the AI encoding apparatus 1300 of FIG. 13 may be used for AI upscaling as well as AI downscaling.

The AI setter 1318 may obtain DNN setting information corresponding to a type of a region included in an original part image. Because regions identified in an original image may include an object region of interest, a boundary region, and a non-interest region, a mapping relationship between the object region of interest, the boundary region, and the non-interest region and pieces of DNN setting information may be pre-set.

As shown in FIG. 17, when an object region of interest is included in any one original part image and an object of interest is a face object, the AI setter 1318 may obtain DNN setting information A. When an object region of interest is included in any one original part image and an object of interest is a text object, the AI setter 1318 may obtain DNN setting information B. Also, when a boundary region is included in any one original part image, the AI setter 1318 may obtain DNN setting information C, and when a non-interest region is included in any one original part image, the AI setter 1318 may obtain DNN setting information D.

In an embodiment, the AI setter 1318 may obtain DNN setting information to be applied to each original part image by further considering input information along with a type of a region included in each original part image. The input information may include at least one of a target resolution of a first image to be obtained from an original part image, a target bitrate of image data, a type of a bitrate of the image data (e.g., a variable bitrate type, a constant bitrate type, or an average bitrate type), a color format to which AI scaling is applied (a luminance component, a chrominance component, a red component, a green component, or a blue component), a codec type for performing first encoding, compression history information, a resolution of the original part image, and a type of the original part image.

In an embodiment, when each of a plurality of original part images includes a plurality of frames, the AI setter 1318 may independently obtain DNN setting information for each certain number of frames, and may provide the independently obtained DNN setting information to the AI scaler 1312.

In an embodiment, the AI setter 1318 may divide frames constituting each original part image into a certain number of groups, and may independently obtain DNN setting information for each group. The same DNN setting information or different pieces of DNN setting information may be obtained for each group. The same number of frames or different numbers of frames may be included in each group.

In another example, the AI setter 1318 may independently determine DNN setting information for each frame constituting each original part image. The same DNN setting information or different pieces of DNN setting information may be obtained for each frame.

Referring back to FIG. 13, the AI scaler 1312 performs AI scaling on a plurality of original part images by using a first DNN set with the DNN setting information provided from the AI setter 1318. A plurality of first images corresponding to the plurality of original part images are obtained as a result of the AI scaling.

The AI scaler 1312 obtains a first image by performing AI scaling on an original part image including an object region of interest, and obtains a first image by performing AI scaling on an original part image including a non-interest region. A size change magnification of the original part image including the object region of interest may be greater than a size change magnification of the original part image including the non-interest region. In other words, when sizes of original part images are the same, a size of a first image obtained through AI scaling on the original part image including the object region of interest may be greater than a size of a first image obtained through AI scaling on the original part image including the non-interest region, which will be described with reference to FIG. 18.

Figure 18:
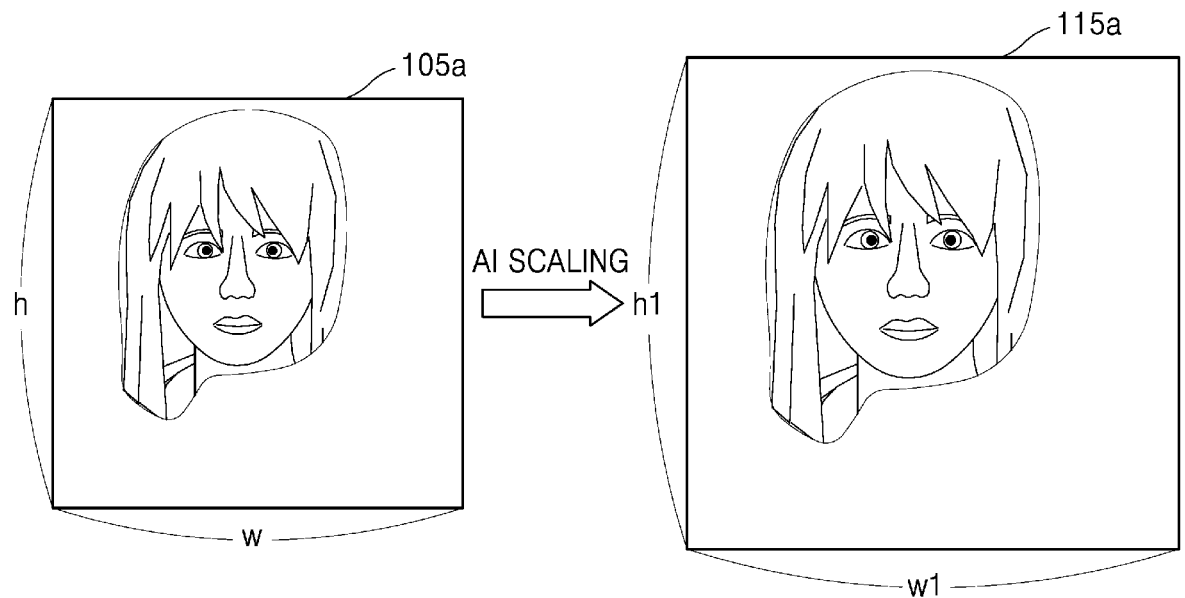
FIG. 18 is a view illustrating a plurality of first images obtained through independent AI scaling on a plurality of original part images.
Figure 18:
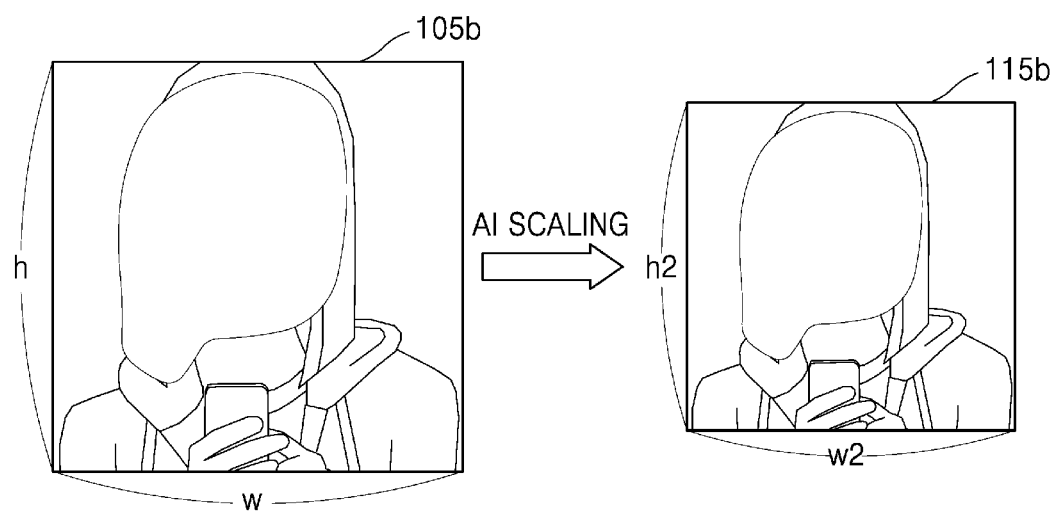

FIG. 18 is a view illustrating a plurality of first images 115*a* and 115*b* obtained through independent AI scaling on a plurality of original part images 105*a* and 105*b*.

As described above, the AI setter 1318 may obtain DNN setting information by considering a type of a region included in each of a plurality of original part images, and AI scaling of the plurality of original part images may be independently performed according to the DNN setting information. That is, AI scaling may be performed on an original part image including an object region of interest through a first DNN operating according to DNN setting information A, and AI scaling may be performed on an original part image including a non-interest region through a first DNN operating according to DNN setting information B.

Size change magnifications of the plurality of original part images through AI scaling may vary according to types of regions included in the original part images. As shown in FIG. 18, when the original part image 105*a* including an object region of interest has a width w and a height h, the first image 115*a* having a width w1 and a height h1 may be obtained through AI scaling on the original part image 105*a*. Also, when the original part image 105*b* including a non-interest region has a width w and a height h, the first image 115*b* having a width w2 and a height h2 may be obtained through AI scaling on the original part image 105*b*. In this case, a size change magnification (h1/h or w1/w) of the original part image 105*a* including the object region of interest may be greater than a size change magnification (h2/h or w2/w) of the original part image 105*b*.

According to an implementation, the size change magnification (h1/h or w1/w) of the original part image 105*a* including the object region of interest may be equal to or greater than 1, and the size change magnification (h2/h or w2/w) of the original part image 105*b* including the non-interest region may be less than 1. In other words, because the first image 115*a* including the object region of interest obtained by the AI scaler 1312 is larger than the first image 115*b* including the non-interest region obtained by the AI scaler 1312, first encoding is performed on the object region of interest in higher quality than on the non-interest region.

In an embodiment, when a boundary region is identified in an original image, a size change magnification of an original part image including the boundary region may have a value between the size change magnification (h1/h or w1/w) of the original part image including the object region of interest and the size change magnification (h2/h or w2/w) of the original part image including the non-interest region.

Also, in an embodiment, when two or more types of objects of interest are detected in an original image, a size change magnification of an original part image including any one object region of interest and a size change magnification of an original part image including the other object region of interest may be determined to be different from each other. For example, size change magnifications of original part images may be determined differently according to degrees of importance of two or more types of objects of interest. In detail, when a degree of importance of a face object is higher than a degree of importance of a text object, a size change magnification of an original part image including a face object region may be greater than a size change magnification of an original part image including a text object region.

As described above, the AI setter 1318 obtains DNN setting information to be applied to AI scaling on each original part image by considering a type of a region included in each original part image. The AI setter 1318 determines a target of a size change magnification through AI scaling on each original part image by considering a type of a region included in each original part image. The AI setter 1318 may obtain DNN setting information causing the determined size change magnification.

A plurality of first images obtained by the AI scaler 1312 are output to the first encoder 1314. The first encoder 1314 obtains image data by performing first encoding on the plurality of first images, and outputs the image data to the data processor 1316. The first encoder 1314 may obtain a plurality of pieces of image data by independently performing first encoding on the plurality of first images.

The first encoder 1314 may perform first encoding on the plurality of first images according to an image compression method based on frequency transformation, thereby reducing the amount of information contained in the plurality of first images. The image data is obtained, as a result of the first encoding via a certain codec (e.g., MPEG-2, H.264, MPEG-4, HEVC, VC-1, VP8, VP9, or AV1). The image data is obtained according to rules, that is, syntax, of the certain codec. For example, the image data may include residual data that is a difference between the plurality of first images and prediction data of the plurality of first images, prediction mode information used to perform the first encoding on the plurality of first images, motion information, and quantization parameter-related information used during the first encoding on the plurality of first images.

As described above, the region identifier 1311 may determine a quantization parameter for regions identified in an original image from region information, and may transmit the determined quantization parameter to the first encoder 1314. The quantization parameter provided from the region identifier 1311 to the first encoder 1314 may be a delta quantization parameter. The region identifier 1311 may notify the first encoder 1314 of which quantization parameter is to be applied to which type of region.

In an embodiment, the region identifier 1311 may determine a quantization parameter of an object region of interest to be smaller than a quantization parameter of a non-interest region, so that first encoding is performed on a first image including the object region of interest in higher quality than on a first image including the interested region. When two or more types of objects of interest are detected in the original image, the region identifier 1311 may determine quantization parameters of two or more types of object regions of interest by considering degrees of importance of objects of interest. For example, when a face object and a text object are identified as objects of interest in the original image and a degree of importance of the face object is higher than a degree of importance of the text object, the region identifier 1311 may determine a quantization parameter of a face object region to be smaller than a quantization parameter of a text object region.

When a boundary region is identified in the original image, the region identifier 1311 may determine a quantization parameter of an object region of interest to be smaller than a quantization parameter of a non-interest region, and may determine a quantization parameter of the boundary region to be a value between the quantization parameter of the object region of interest and the quantization parameter of the non-interest region.

In an embodiment, a quantization parameter provided from region information to the first encoder 1314 may be represented as a quantization parameter map.

FIG. 19 is a diagram illustrating a quantization parameter map 1900 obtained from region information.

As shown in FIG. 19, a portion corresponding to an object region of interest in the quantization parameter map 1900 may have a quantization parameter of 10 and a portion corresponding to a non-interest region may have a quantization parameter of 20.

The first encoder 1314 may perform first encoding on first images according to quantization parameters of regions. In detail, the first encoder 1314 may perform first encoding on a first image including an object region of interest according to a quantization parameter for the object region of interest, and may perform first encoding on a first image including a non-interest region according to a quantization parameter for the non-interest region.

The AI setter 1318 may transmit AI data to the data processor 1316. The AI data includes information based on which an AI scaler 2036 of the AI decoding apparatus 2000 may perform AI scaling on second images according to a size change magnification of AI scaling of the AI encoding apparatus 1300. According to an implementation, the AI data may further include region information provided from the region identifier 1311.

The AI encoding apparatus 700 of FIG. 7 may obtain one first image by performing AI downscaling on one original image, whereas the AI encoding apparatus 1300 of FIG. 13 may obtain a plurality of first images through AI scaling on a plurality of original part images. Accordingly, the AI setter 1318 may generate a plurality of AI data indicating pieces of DNN setting information used for individual AI scaling on the plurality of original part images.

In an embodiment, the AI data may include at least one of resolution difference information between an original part image and a first image, first image-related information, and information of a type of a region included in the first image (i.e., information indicating whether a region included in the first image is an object region of interest, a non-interest region, or a boundary region). The first image-related information may include information about at least one of a resolution of the first image, a bitrate of image data obtained as a result of performing first encoding on the first image, and a type of a codec used during the first encoding of the first image.

In another embodiment, the AI data may include an identifier of DNN setting information that is mutually agreed, so that AI scaling is performed on a second image according to a size change magnification of AI scaling by the AI scaler 1312.

In another embodiment, the AI data may include DNN setting information settable in the second DNN of the AI decoding apparatus 2000.

The data processor 1316 generates AI encoding data including the image data received from the first encoder 1314 and the AI data received from the AI setter 1318. A structure of the AI encoding data generated by the data processor 1316 has been described with reference to FIGS. 9 and 10, and thus, a detailed description thereof will be omitted.

The AI encoding data is transmitted to the transmitter 1330. The transmitter 1330 transmits the AI encoding data obtained as a result of AI encoding through a network.

In an embodiment, the AI encoding data may be stored in any of data storage media including a magnetic medium such as a hard disk, a floppy disk, or a magnetic tape, an optical recording medium such as a CD-ROM or a DVD, and a magneto-optical medium such as a floptical disk.

Pre-processing of the original image by the pre-processor 1319 may include filtering of the original image, which will be described.

The pre-processor 1319 may filter regions identified in the original image according to region information received from the region identifier 1311.

In an embodiment, the pre-processor 1319 may perform first filtering on an object region of interest in the original image, and may perform second filtering on a non-interest region. For example, the first filtering may be high-pass filtering, and the second filtering may be low-pass filtering. According to the high-pass filtering, the object region of interest in the original image may be sharper, and the non-interest region may be smoother.

In another example, the first filtering and the second filtering may be both low-pass filtering, and a cutoff frequency of the first filtering may be higher than a cutoff frequency of the second filtering. When two or more types of object regions of interest are identified in the original image, the pre-processor 1319 may perform first filtering on the two or more types of object regions of interest at different cutoff frequencies.

In another embodiment, the pre-processor 1319 may perform first filtering on an object region of interest, may perform second filtering on a boundary region, and may perform third filtering on a non-interest region. For example, the first filtering and the second filtering may be high-pass filtering, the third filtering may be low-pass filtering, and a cutoff frequency of the first filtering may be lower than a cutoff frequency of the second filtering.

The pre-processor 1319 may filter regions identified in the original image by using different methods. When the pre-processor 1319 filters different types of regions by using the same method, the pre-processor 1319 may differently set setting values, for example, cutoff frequencies, to derive different filtering results as described above.

The original image pre-processed by the pre-processor 1319 is output to the AI scaler 1312, and the AI scaler 1312 performs AI scaling on the pre-processed original image by using the first DNN operating according to DNN setting information provided from the AI setter 1318.

A method by which the AI setter 1318 obtains DNN setting information has been described with reference to FIG. 7, and thus, a detailed description thereof will be omitted.

The first encoder 1314 performs first encoding on a first image obtained by the AI scaler 1312, and outputs image data to the data processor 1316. In an embodiment, the region identifier 1311 may determine a quantization parameter to be applied to each region in the original image based on region information, and may transmit the determined quantization parameter to the first encoder 1314. The first encoder 1314 may perform first encoding on the first image based on the quantization parameter provided from the region identifier 1311.

The AI setter 1318 outputs AI data to the data processor 1316. The AI data includes pieces of information based on which the AI decoding apparatus 2000 may perform AI scaling on second images according to a size change magnification of AI scaling of the AI encoding apparatus 1300. The AI data may further include region information provided from the region identifier 1311.

The data processor 1316 generates AI encoding data including the image data and the AI data. The AI encoding data is transmitted to the transmitter 1330. The transmitter 1330 transmits the AI encoding data obtained as a result of AI encoding through a network.

In an embodiment, the AI encoding data may be stored in any of data storage media including a magnetic medium such as a hard disk, a floppy disk, or a magnetic tape, an optical recording medium such as a CD-ROM or a DVD, and a magneto-optical medium such as a floptical disk.

Figure 20:
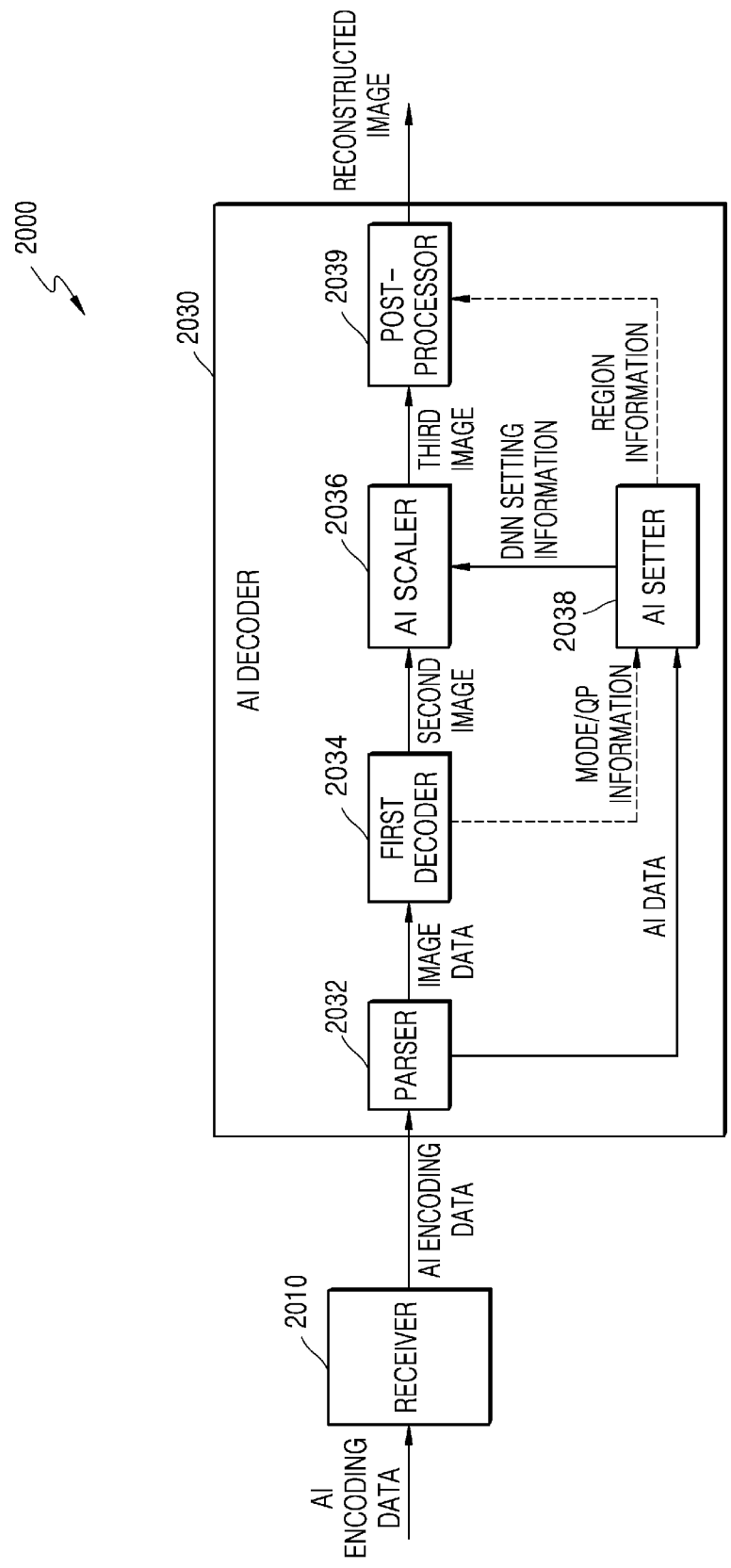
FIG. 20 is a block diagram illustrating a configuration of an AI decoding apparatus, according to another embodiment.

FIG. 20 is a block diagram illustrating a configuration of the AI decoding apparatus 2000, according to an embodiment.

Referring to FIG. 20, the AI decoding apparatus 2000 according to an embodiment includes a receiver 2010 and an AI decoder 2030. The AI decoder 2030 may include a parser 2032, a first decoder 2034, the AI scaler 2036, an AI setter 2038, and a post-processor 2039.

Although the receiver 2010 and the AI decoder 2030 are illustrated as individual devices in FIG. 20, the receiver 2010 and the AI decoder 2030 may be implemented as one processor. In this case, the receiver 2010 and the AI decoder 2030 may be implemented as a dedicated processor, or may be implemented through a combination of S/W and a general-purpose processor such as an AP, a CPU, or a GPU. Also, when the receiver 2010 and the AI decoder 2030 are implemented as a dedicated processor, the dedicated processor may include a memory for implementing an embodiment of the present disclosure or a memory processor for using an external memory.

The receiver 2010 and the AI decoder 2030 may include a plurality of processors. In this case, the receiver 2010 and the AI decoder 2030 may be implemented through a combination of dedicated processors, or a combination of S/W and a plurality of general-purpose processors such as an AP, a CPU, and a GPU.

The receiver 2010 receives AI encoding data obtained as a result of AI encoding. For example, the AI encoding data may be a video file having a file format such as mp4 or mov.

The receiver 2010 may receive the AI encoding data transmitted through a network. The receiver 2010 outputs the AI encoding data to the AI decoder 2030.

In an embodiment, the AI encoding data may be obtained from any of data storage media including a magnetic medium such as a hard disk, a floppy disk, or a magnetic tape, an optical recording medium such as a CD-ROM or a DVD, and a magneto-optical medium such as a floptical disk.

The parser 2032 parses the AI encoding data and respectively transmits image data and AI data generated as a result of performing first encoding on a first image to the first decoder 2034 and the AI setter 2038. A structure of the AI encoding data parsed by the parser 2032 has been described with reference to FIGS. 9 and 10, and thus, a detailed description thereof will be omitted.

The parser 2032 may identify that the image data included in the AI encoding data is image data obtained via a certain codec (e.g., MPEG-2, H.264, MPEG-4, HEVC, VC-1, VP8, VP9, or AV1). In this case, corresponding information may be transmitted to the first decoder 2034 so that the image data is processed via the identified codec.

The first decoder 2034 reconstructs a second image corresponding to the first image based on the image data received from the parser 2032. When pre-processing on an original image is cropping, the first decoder 2034 may obtain a plurality of second images corresponding to a plurality of first images by performing first decoding on a plurality of pieces of image data.

The second image obtained by the first decoder 2034 is provided to the AI scaler 2036. According to an implementation, first decoding-related information such as prediction mode information, motion information, and quantization parameter information may be provided from the first decoder 2034 to the AI setter 2038. The first decoding-related information may be used to obtain DNN setting information.

The AI data provided to the AI setter 2038 includes pieces of information for performing AI scaling on the second image. The AI data may further include region information.

In an embodiment, the AI data may include at least one of resolution difference information between the original image (or original part image) and the first image, first image-related information, and information of a type of a region included in the first image (i.e., information indicating whether a region included in the first image is an object region of interest, a non-interest region, or a boundary region). The first image-related information may include information about at least one of a resolution of the first image, a bitrate of image data obtained as a result of performing first encoding on the first image, and a type of a codec used during the first encoding of the first image.

In another embodiment, the AI data may include an identifier of DNN setting information that is mutually agreed, so that AI scaling is performed on a second image according to a size change magnification of AI scaling by the AI scaler 1312 of the AI encoding apparatus 1300.

In another embodiment, the AI data may include DNN setting information settable in a second DNN used by the AI scaler 2036 of the AI decoding apparatus 2000.

The AI setter 2038 obtains DNN setting information to be set in the second DNN of the AI scaler 2036 based on the AI data. Each DNN setting information may include information about at least one of the number of convolution layers included in the second DNN, the number of filter kernels for each convolution layer, and parameters of each filter kernel.

The AI setter 2038 may obtain DNN setting information to be set in the second DNN of the AI scaler 2036 from among a plurality of pieces of DNN setting information that are pre-stored. Each of the plurality of pieces of DNN setting information is information for obtaining a third image having a pre-determined resolution and/or a pre-determined image quality, and is obtained through joint training with a first DNN used by the AI encoding apparatus 1300.

A magnification at which a size of the second image is changed through AI scaling by the second DNN may vary according to DNN setting information. For example, any one DNN setting information may be used to obtain a third image having a size that is twice a size of the second image, and another DNN setting information may be used to obtain a third image having a size that is three times a size of the second image.

In an embodiment, some of the plurality of pieces of DNN setting information stored in the AI setter 2038 may be used to obtain a third image having a size less than a size of the second image. That is, all of pieces of DNN setting information described with reference to FIG. 2 are used to increase a size of the second image, but some of pieces of DNN setting information that may be used by the AI decoding apparatus 2000 of FIG. 20 may be used to reduce a size of the second image. In other words, the second DNN may perform AI downscaling as well as AI upscaling.

When independent AI scaling is required for each of a plurality of second images, the AI setter 2038 may obtain pieces of DNN setting information used for AI scaling of the plurality of second images.

In an embodiment, the AI setter 2038 may obtain DNN setting information for performing AI scaling on the second image from among the plurality of pieces of DNN setting information, based difference information included in the AI data. For example, when it is determined based on the difference information that a resolution (e.g., 4K (4096*2160)) of the original image (or original part image) is twice a resolution (e.g., 2K (2048*1080)) of the first image, the AI setter 2038 may obtain DNN setting information for doubling the resolution of the second image.

In another embodiment, the AI setter 2038 may obtain DNN setting information for performing AI scaling on the second image from among the plurality of pieces of DNN setting information, based on first image-related information included in the AI data. The AI setter 2038 may pre-determine a mapping relationship between pieces of image-related information and pieces of DNN setting information, and may obtain DNN setting information mapped to first image-related information, which has been described with reference to FIG. 5, and thus, a detailed description thereof will be omitted.

In another embodiment, the AI setter 2038 may obtain DNN setting information for performing AI scaling on the second image from among the plurality of pieces of DNN setting information, by considering all of information provided from the first decoder 2034 (prediction mode information, motion information, and quantization parameter information) and first image-related information included in the AI data.

In another embodiment, the AI setter 2038 may obtain DNN setting information for performing AI scaling on the second image from among the plurality of pieces of DNN setting information by considering region information and first image-related information included in the AI data. The AI setter 2038 may pre-determine a mapping relationship between types of regions, pieces of image-related information, and pieces of DNN setting information, and may obtain DNN setting information mapped to a type of a region included in the second region and first image-related information.

In another embodiment, the AI setter 2038 may obtain DNN setting information corresponding to an identifier included in the AI data.

In another embodiment, the AI setter 2038 may obtain DNN setting information included in the AI data.

In an embodiment, when the second image includes a plurality of frames, the AI setter 2038 may independently obtain DNN setting information for each certain number of frames, or may obtain common DNN setting information for all of the frames.

The AI scaler 2036 sets the second DNN with DNN setting information provided from the AI setter 2038, and obtains a third image by performing AI scaling on the second image through the second DNN. A structure of the second DNN is the same as that of FIG. 3, and thus, a detailed description thereof will be omitted.

When a plurality of second images are obtained by the first decoder 2034, the AI scaler 2036 may obtain a plurality of third images by performing AI scaling on the plurality of second images. AI scaling of the plurality of second images will be described with reference to FIG. 21.

Figure 21:
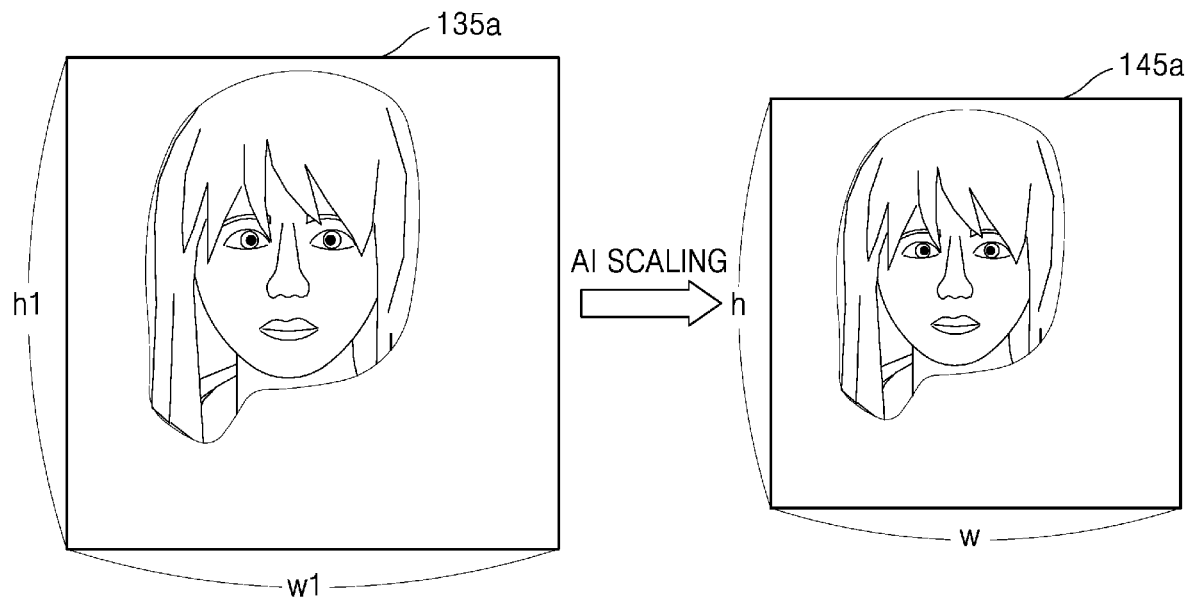
FIG. 21 is a view illustrating a plurality of third images obtained through independent AI scaling on a plurality of second images.
Figure 21:
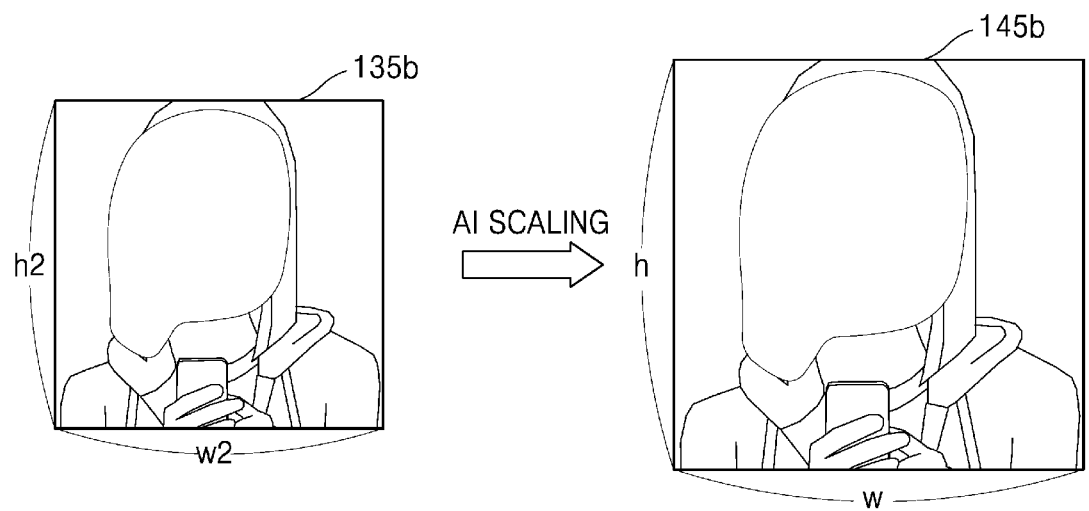

FIG. 21 is a view illustrating a plurality of third images 145a and 145b obtained through independent AI scaling on a plurality of second images 135a and 135b.

As described above, the AI setter 2038 may obtain DNN setting information for each of the plurality of second images 135a and 135b, and AI scaling of the plurality of second images 135 and 135b may be independently performed according to the DNN setting information. That is, AI scaling may be performed on the second image 135a including an object region of interest through a second DNN operating according to DNN setting information A, and AI scaling may be performed on the second image 135b including a non-interest region through a second DNN operating according to DNN setting information B.

Size change magnifications of the plurality of second images 135a and 135b through AI scaling may vary according to types of regions included in the second images 135a and 135b.

As shown in FIG. 21, when the second image 135a including an object region of interest has a width w1 and a height h1, the third image 145a having a width w and a height h may be obtained through AI scaling on the second image 135a. Also, when the second image 135b including a non-interest region has a width w2 and a height h2, the third image 145b having a width w and a height h may be obtained through AI scaling on the second image 135b. That is, although a size of the second image 135a including the object region of interest and a size of the second image 135b including the non-interest region are different from each other, sizes of the third images 145a and 145b obtained through AI scaling of the second images 135a and 135b may be the same.

A size change magnification (h/h1 or w/w1) of the second image 135a including the object region of interest may be less than a size change magnification (h/h2 or w/w2) of the second image 135b including the non-interest region. According to an implementation, the size change magnification (h/h1 or w/w1) of the second image including the object region of interest may be less than 1, and the size change magnification (h/h2 or w/w2) of the second image including the non-interest region may be greater than 1.

In an embodiment, when a boundary region is included in any one second image, a size change magnification of the second image including the boundary region may have a value between the size change magnification of the second image 135a including the object region of interest and the size change magnification of the second image 135b including the non-interest region.

Also, in an embodiment, when two or more types of objects of interest are detected in an original image, a size change magnification of a second image including any one object region of interest and a size change magnification of a second image including the other object region of interest may be determined to be different from each other. For example, when a degree of importance of a face object is higher than a degree of importance of a text object, a size change magnification of a second image including a face object region may be less than a size change magnification of a second image including a text object region.

When a plurality of third images are obtained according to AI scaling of a plurality of second images, the post-processor 2039 obtains a reconstructed image corresponding to the original image by combining the plurality of third images. Region information provided from the AI setter 2038 may be used to combine the plurality of third images.

In general, it is complicated to obtain one image by combining several individually captured images. This is because it is necessary to remove distortion due to a difference in brightness or focus of each image in order to combine several individually captured images. In the present disclosure, because the plurality of third images are obtained as a result of processing a plurality of original part images included in one original image, a high-quality reconstructed image may be more easily obtained, compared to a case where one image is obtained by combining several individually captured images.

In an example, the post-processor 2039 may combine the plurality of third images through a DNN for stitching. The DNN for stitching may be pre-trained. In another example, the post-processor 2039 may combine the plurality of third images by using a mosaicing method, or may combine the plurality of third images by using any of other well-known image combining methods.

Figure 22:
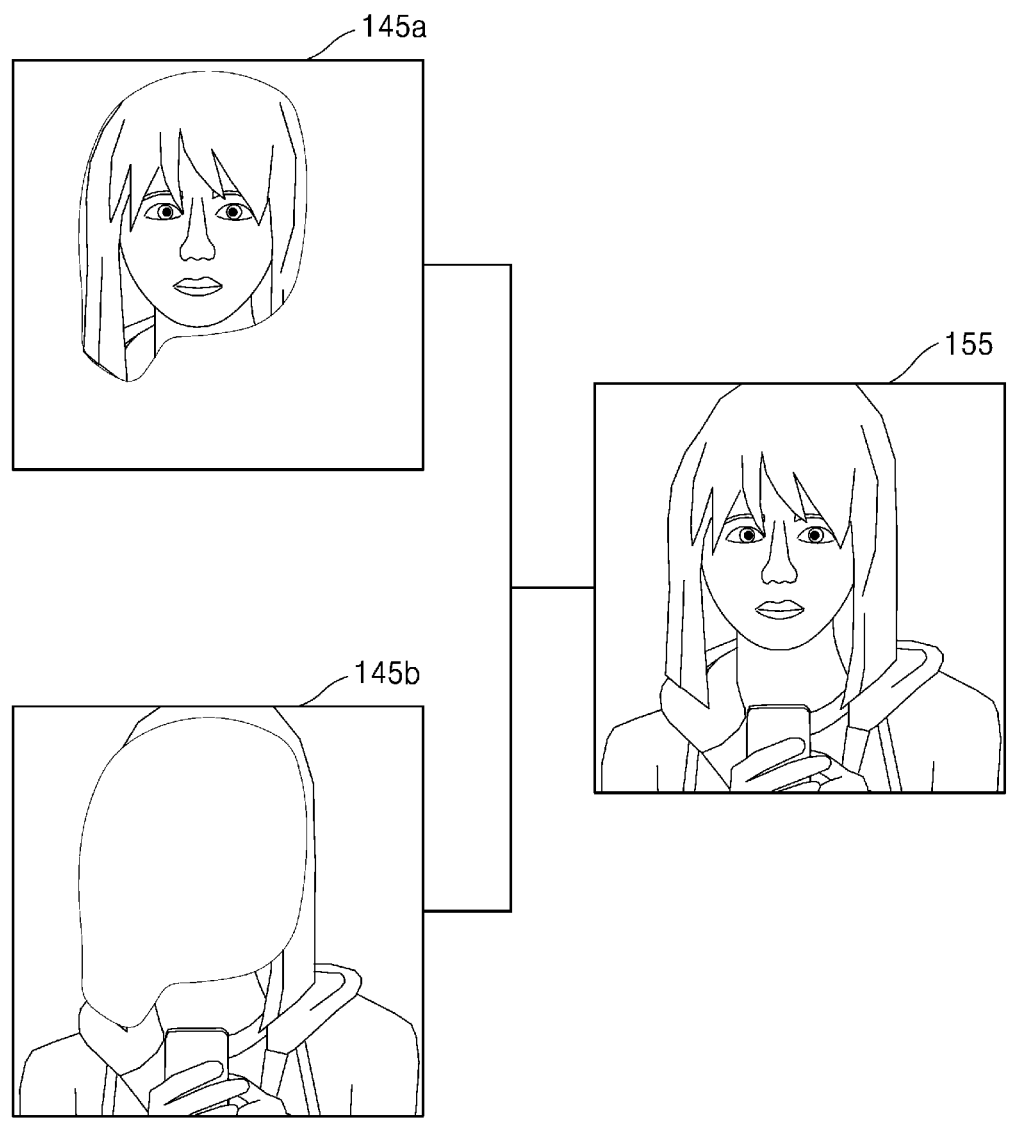
FIG. 22 is a diagram illustrating a reconstructed image obtained as a result of combining a plurality of third images.

FIG. 22 is a diagram illustrating a reconstructed image 155 obtained as a result of combining the plurality of third images 145a and 145b.

As shown in FIG. 22, the post-processor 2039 may obtain the reconstructed image 155 including both an object region of interest and a non-interest region by combining the third image 145a including the object region of interest and the third image 145b including the non-interest region.

When there are the third image 145a including an object region of interest, a third image including a boundary region, and the third image 145b including a non-interest region, the post-processor 2039 may obtain the reconstructed image 155 including the object region of interest, the boundary region, and the non-interest region by combining the third images.

As described above, when pre-processing on the original image is filtering, the post-processor 2039 may obtain a reconstructed image by filtering each region in the third image.

The post-processor 2039 may filter regions in the third images according to region information transmitted from the AI setter 2038. The post-processor 2039 may apply, to each region in the third image, a filtering method corresponding to (or paired with) a filtering method applied by the pre-processor 1319 of the AI encoding apparatus 1300 to each region in an original image. For example, when the pre-processor 1319 performs low-pass filtering on the object region of interest in the original image, the post-processor 2039 may perform high-pass filtering on the object region of interest in the third image. Also, when the pre-processor 1319 performs high-pass filtering on the object region of interest in the original image, the post-processor 2039 may perform low-pass filtering on the object region of interest in the third image.

The post-processor 2039 may filter regions included in the third images by using different methods. When the post-processor 2039 filters different types of regions by using the same method, the post-processor 2039 may differently set setting values, for example, cutoff frequencies, to derive different filtering results.

Joint training of the first DNN used by the AI encoding apparatus 1300 and the second DNN used by the AI decoding apparatus 2000 is the same as that described with reference to FIGS. 11 and 12. However, as described above, the first DNN of the AI encoding apparatus 1300 may perform AI upscaling as well as AI downscaling, and the second DNN of the AI decoding apparatus 2000 may perform AI downscaling as well as AI upscaling. Accordingly, when the first DNN and the second DNN are trained so that the first DNN increases a size of the original training image 1101 and the second DNN reduces a size of the first training image 1102, an enlarged training image increased from the original training image 1101 is used instead of the reduced training image 1103, to obtain structural loss information. The enlarged training image may be obtained through legacy upscaling of the original training image 1101. The legacy upscaling may include at least one of bilinear scaling, bicubic scaling, Lanczos scaling, and stairstep scaling.

Figure 23:
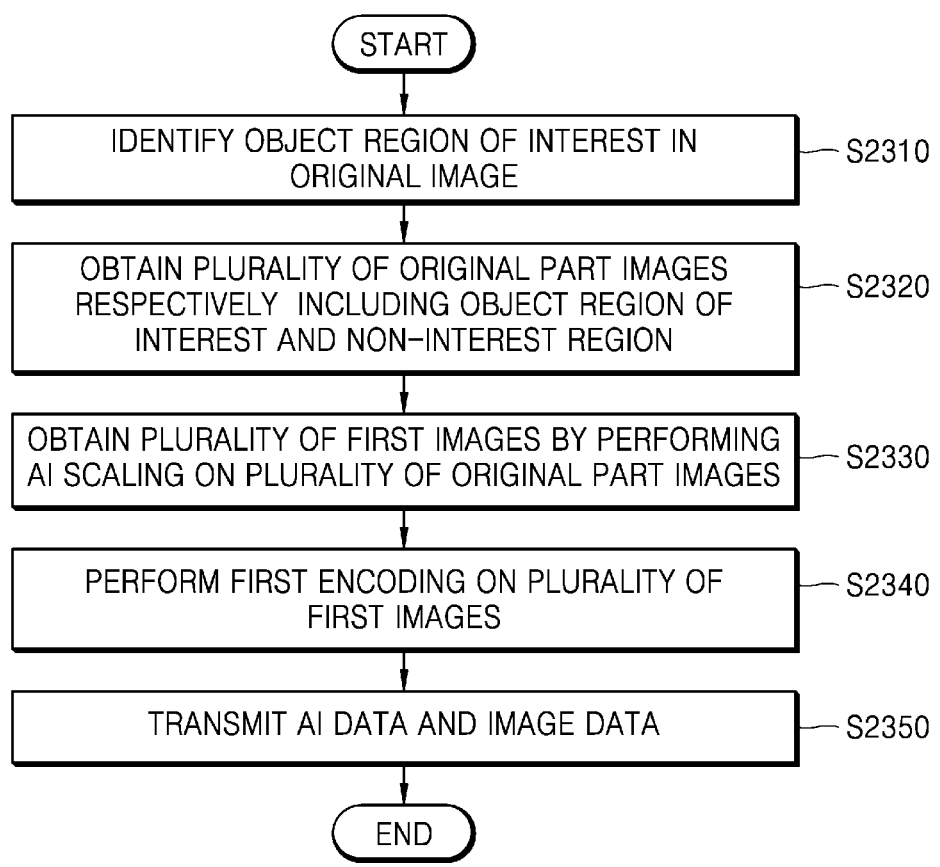
FIG. 23 is a flowchart illustrating an AI encoding method performed by an AI encoding apparatus, according to anther embodiment.

FIG. 23 is a flowchart illustrating an AI encoding method by the AI encoding apparatus 1300, according to another embodiment.

Referring to FIG. 23, in operation S2310, the AI encoding apparatus 1300 identifies an object region of interest in an original image. The AI encoding apparatus 1300 may identify an object region of interest in an original image, and may identify a portion other than the object region of interest as a non-interest region.

In an embodiment, the AI encoding apparatus 1300 may identify a portion between the object region of interest and the non-interest region in the original image as a boundary region.

In operation S2320, the AI encoding apparatus 1300 obtains a plurality of original part images respectively including the object region of interest and the non-interest region.

The AI encoding apparatus 1300 may obtain the plurality of original part images by cropping the original image. According to an implementation, the AI encoding apparatus 1300 may apply filtering, instead of cropping, to the original image. In this case, the AI encoding apparatus 1300 obtains a filtered original image.

In operation S2330, the AI encoding apparatus 1300 obtains a plurality of first images by performing AI scaling on the plurality of original part images.

The AI encoding apparatus 1300 may obtain a plurality of pieces of DNN setting information to be applied to AI scaling of the plurality of first images by considering types of regions included in the plurality of first images. The AI encoding apparatus 1300 may perform AI scaling on any one original part image by using a first DNN operating according to any one DNN setting information from among the plurality of pieces of DNN setting information and may obtain a first image corresponding to the original part image. The AI encoding apparatus 1300 may perform AI scaling on another original part image by using a first DNN operating according to another DNN setting information from among the plurality of pieces of DNN setting information and may obtain a first image corresponding to the original part image. That is, the AI encoding apparatus 1300 may independently perform AI scaling on the original part images by using the respective DNN setting information.

When the filtered original image is obtained, the AI encoding apparatus 1300 may obtain DNN setting information corresponding to the filtered original image, may perform AI scaling on the filtered original image by using a first DNN set with the DNN setting information, and may obtain a first image.

In operation S2340, the AI encoding apparatus 1300 obtains image data by performing first encoding on the plurality of first images. A quantization parameter obtained from region information indicating a location of each region in the original image may be used to perform first encoding on the plurality of first images.

When one first image is obtained through AI scaling on the filtered original image, the AI encoding apparatus 1300 may obtain image data by performing first encoding on the first image.

In operation S2350, the AI encoding apparatus 1300 transmits AI data related to AI scaling, and the image data to the AI decoding apparatus 2000.

According to an implementation, the AI data and the image data may be stored in any of data storage media including a magnetic medium such as a hard disk, a floppy disk, or a magnetic tape, an optical recording medium such as a CD-ROM or a DVD, and a magneto-optical medium such as a floptical disk.

Figure 24:
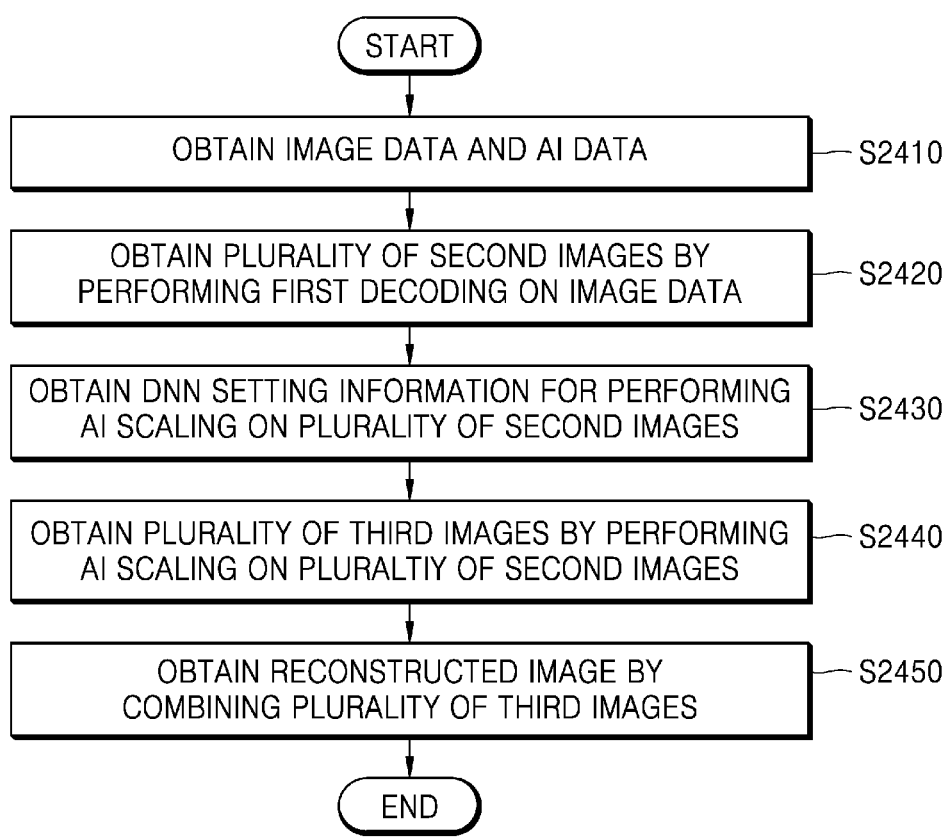
FIG. 24 is a flowchart illustrating an AI decoding method performed by an AI decoding apparatus, according to another embodiment.

FIG. 24 is a flowchart illustrating an AI decoding method by the AI decoding apparatus 2000, according to another embodiment.

Referring to FIG. 24, in operation S2410, the AI decoding apparatus 2000 obtains AI data related to AI scaling, and image data.

In operation S2420, the AI decoding apparatus 2000 obtains a plurality of second images by performing first decoding on the image data. According to an implementation, the AI decoding apparatus 2000 may obtain one second image by performing first decoding on the image data.

In operation S2430, the AI decoding apparatus 2000 obtains DNN setting information for performing AI scaling on the plurality of second images. Different pieces of DNN setting information may be obtained for the plurality of second images. When one second image is obtained through first decoding of the image data, the AI decoding apparatus 2000 may obtain DNN setting information for performing AI scaling on the one second image.

In operation S2440, the AI decoding apparatus 2000 obtains a plurality of third images by performing AI scaling on the plurality of second images. AI scaling may be independently performed on the plurality of second images according to a second DNN operating according to the DNN setting information. When one second image is obtained through first decoding of the image data, the AI decoding apparatus 2000 obtains one third image by performing AI scaling on the one second image.

In operation S2450, the AI decoding apparatus 2000 obtains a reconstructed image corresponding to an original image by combining the plurality of third images.

When one third image is obtained through AI scaling, the AI decoding apparatus 2000 may obtain a reconstructed image by filtering each region in the third image.

Meanwhile, the embodiments of the present disclosure may be written as computer-executable programs or instructions, and the computer-executable programs or instructions may be stored in a medium.

The medium may continuously store the computer-executable programs or instructions, or may temporally store the computer-executable programs or instructions for execution or downloading. Also, the medium may be any of various recording media or storage media in which a single piece or plurality of pieces of hardware are combined, and the medium is not limited to a medium directly connected to a computer system, but may be distributed on a network. Examples of the medium may include magnetic media such as a hard disk, a floppy disk, and a magnetic tape, optical recording media such as a CD-ROM and a DVD, magneto-optical media such as a floptical disk, and devices configured to store program instructions such as a ROM, a random-access memory (RAM), and a flash memory. Also, other examples of the medium may include recording media and storage media managed by application stores distributing applications or by websites, servers, and the like supplying or distributing other various types of software.

Meanwhile, a model related to the DNN described above may be implemented as software. When a DNN model is implemented as a software module (e.g., a program module including instructions), the DNN model may be stored in a computer-readable recording medium.

Also, the DNN model may be manufactured as a hardware chip to be a part of the AI decoding apparatus 200 or 2000 or the AI encoding apparatus 700 or 1300 described above. For example, the DNN model may be manufactured as a dedicated hardware chip for AI, or may be manufactured as a part of an existing general-purpose processor (e.g., a CPU or an AP) or a dedicated graphics processor (e.g., a GPU).

Also, the DNN model may be provided as downloadable software. A computer program product may include a product (e.g., a downloadable application) in a form of a software program electronically distributed through a manufacturer or an electronic market. For electronic distribution, at least a part of the software program may be stored in a storage medium or may be temporarily generated. In this case, the storage medium may be a storage medium of a server of the manufacturer or electronic market, or a relay server.

Although the scope of the present disclosure has been described with reference to preferred embodiments, the scope of the present disclosure is not limited to the embodiments, and various modifications and changes may be made by one of ordinary skill in the art without departing from the scope of the present disclosure.

What is claimed is:

1. An artificial intelligence (AI) encoding apparatus comprising:
a memory storing one or more instructions; and
a processor configured to execute the one or more instructions stored in the memory to:
identify an object region of interest in an original image,
obtain, from the original image, a first original part image comprising the object region of interest, and a second original part image comprising a non-interest region,
obtain a plurality of first images by performing AI scaling on the first original part image and the second original part image through a scaling neural network (NN),
wherein the performing AI scaling comprises applying the first original part image to the scaling NN that is configured with first NN setting information selected from among a plurality of NN setting information to increase a size of the first original part image or to maintain the size of the first original part image, and applying the second original part image to the scaling NN that is configured with second NN setting information selected from among the plurality of NN setting information to decrease a size of the second original part image,
generate image data by encoding the plurality of first images, and
transmit the image data, and AI data comprising information related to the AI scaling.

2. The AI encoding apparatus of claim 1, wherein the processor is further configured to
determine quantization parameters corresponding to the object region of interest and the non-interest region, respectively, and
encode the plurality of first images based on the determined quantization parameters.

3. The AI encoding apparatus of claim 1, wherein the processor is further configured to identify a boundary region located between the object region of interest and the non-interest region in the original image, and
obtain, from the original image, a third original part image comprising the boundary region.

4. The AI encoding apparatus of claim 3, wherein a size change magnification of the third original part image through the AI scaling has a value between a size change magnification of the first original part image through the AI scaling and a size change magnification of the second original part image through the AI scaling.

5. The AI encoding apparatus of claim 1, wherein the memory stores a plurality of neural network parameter sets as the plurality of pieces of NN setting information, and
wherein the processor is further configured to:
select a first neural network parameter set from the plurality of neural network parameter sets, configure the scaling NN with the first neural network parameter set, and obtain a scaled-first part image by performing the AI scaling on the first original part image using the scaling NN configured with the first neural network parameter set; and
select a second neural network parameter set from the plurality of neural network parameter sets, configure the scaling NN with the second neural network parameter set, and obtain a scaled-second part image by performing the AI scaling on the second original part image using the scaling NN configured with the second neural network parameter set, and
wherein the plurality of first images comprise the scaled-first part image and the scaled-second part image.

6. An artificial intelligence (AI) decoding apparatus comprising:
a memory storing one or more instructions; and
a processor configured to execute the one or more instructions stored in the memory to:
obtain image data generated as a result of encoding a plurality of first images, and AI data related to AI scaling from a plurality of original part images to the plurality of first images,
obtain a plurality of second images by decoding the image data,
obtain, based on the AI data, first neural network (NN) setting information among a plurality of NN setting information for AI scaling of one second image comprising an object region of interest, and second NN setting information among the plurality of NN setting information for AI scaling of another second image comprising a non-interest region,
generate a plurality of third images by performing AI scaling on the one second image and the another second image through a scaling NN, wherein the performing the AI scaling comprises applying the one second image to the scaling NN that is configured with the first NN setting information to decrease a size of the one second image or to maintain the size of the one second image, and applying the another second image to the scaling NN that is configured with the second NN setting information to increase a size of the another second image, and
obtain a reconstructed image by combining the plurality of third images.

7. The AI decoding apparatus of claim 6, wherein the plurality of original part images are images cropped from an original image.

8. The AI decoding apparatus of claim 6, wherein the memory stores a plurality of neural network parameter sets—as the plurality of NN setting information, and wherein the processor is further configured to:

based on the AI data, select a first neural network parameter set from the plurality of neural network parameter sets, configure the scaling NN with the first neural network parameter set, and obtain one of the third images by performing AI scaling on the one second image using the scaling NN configured with the first neural network parameter set; and select a second neural network parameter set from the plurality of neural network parameter sets, configure the scaling NN with the second neural network parameter set, and obtain another one of the third images by performing AI scaling on the another second image using the scaling NN configured with the second neural network parameter set.

9. An artificial intelligence (AI) encoding method performed by an AI encoding apparatus, the AI encoding method comprising:

identifying an object region of interest in an original image;

obtaining, from the original image, a first original part image comprising the object region of interest, and a second original part image comprising a non-interest region;

obtaining a plurality of first images by performing AI scaling on the first original part image and the second original part image through a scaling deep neural network (NN), wherein the performing the AI scaling comprises applying the first original part image to the scaling NN that is configured with first NN setting information selected from among a plurality of NN setting information to increase a size of the first original part image or to maintain the size of the first original part image, and applying the second original part image to the scaling NN that is configured with second NN setting information selected from among the plurality of NN setting information to decrease a size of the second original part image;

generating image data by encoding the plurality of first images; and transmitting the image data, and AI data comprising information related to the AI scaling.

10. A non-transitory computer-readable recording medium storing a program for executing the AI encoding method of claim 9.

\* \* \* \* \*